US012589450B2

(12) United States Patent　　(10) Patent No.:　US 12,589,450 B2
Zonker et al.　　　　　　　　　　 (45) Date of Patent:　Mar. 31, 2026

(54) BRAZING SHEETS, ARTICLES FORMED FROM BRAZING SHEETS, AND METHODS OF FORMING ARTICLES

(71) Applicant: ARCONIC TECHNOLOGIES LLC, Pittsburgh, PA (US)

(72) Inventors: Harry R. Zonker, Oakmont, PA (US); Andreas K. Kulovits, Pittsburgh, PA (US)

(73) Assignee: ARCONIC TECHNOLOGIES LLC, Pittsburgh, PA (US)

( * ) Notice: Subject to any disclaimer, the term of this patent is extended or adjusted under 35 U.S.C. 154(b) by 0 days.

(21) Appl. No.: 18/579,882

(22) PCT Filed: Jun. 24, 2022

(86) PCT No.: PCT/US2022/073150
§ 371 (c)(1),
(2) Date: Jan. 17, 2024

(87) PCT Pub. No.: WO2023/015072
PCT Pub. Date: Feb. 9, 2023

(65) Prior Publication Data
US 2024/0238909 A1　　Jul. 18, 2024

Related U.S. Application Data

(60) Provisional application No. 63/266,367, filed on Jan. 4, 2022, provisional application No. 63/228,740, filed on Aug. 3, 2021.

(51) Int. Cl.
*B23K 35/02*　　　　(2006.01)
*B23K 1/00*　　　　(2006.01)
(Continued)

(52) U.S. Cl.
CPC ........ *B23K 35/0238* (2013.01); *B23K 1/0012* (2013.01); *B23K 35/288* (2013.01);
(Continued)

(58) Field of Classification Search
None
See application file for complete search history.

(56) References Cited

U.S. PATENT DOCUMENTS

2017/0074604 A1　　3/2017　Perrier et al.

FOREIGN PATENT DOCUMENTS

CN　　111906471　A　　11/2020
JP　　10-298686　A　　11/1998
(Continued)

OTHER PUBLICATIONS

International Search Report and Written Opinion of the International Searching Authority for International Application No. PCT/US2022/073150 mailed Nov. 8, 2022.
(Continued)

*Primary Examiner* — Daniel J. Schleis
(74) *Attorney, Agent, or Firm* — K&L Gates LLP

(57) ABSTRACT

Brazing sheets, articles formed from or including all or a portion of brazing sheets, and methods of forming articles are provided. A brazing sheet comprises a core layer, a brazing layer, and an interliner layer intermediate the core layer and the brazing layer. The core layer comprises a first aluminum alloy and the core layer is at least partially recrystallized. The brazing layer comprises a 4XXX series aluminum alloy. The interliner layer comprises a second aluminum alloy, and the interliner layer is unrecrystallized.

22 Claims, 17 Drawing Sheets

(51) Int. Cl.

| | | |
|---|---|---|
| *B23K 35/28* | (2006.01) | |
| *C22C 21/02* | (2006.01) | |
| *C22C 21/10* | (2006.01) | |
| *B23K 101/14* | (2006.01) | |

(52) U.S. Cl.

CPC .............. *C22C 21/02* (2013.01); *C22C 21/10* (2013.01); *B23K 2101/14* (2018.08)

(56) References Cited

FOREIGN PATENT DOCUMENTS

| | | | | |
|---|---|---|---|---|
| JP | H10298686 | A | * | 11/1998 |
| WO | 03/061962 | A1 | | 7/2003 |
| WO | 03-089237 | A1 | | 10/2003 |
| WO | 2014/017976 | A1 | | 1/2014 |
| WO | 2019-164487 | A1 | | 8/2019 |

OTHER PUBLICATIONS

Somerday, et al., Recrystallisation behaviour of supersaturated Al—Mn alloys, Part 1 —Al-1.3 wt-%Mn, Materials Science and Technology, Jan. 2003, vol. 19, pp. 19-29.

* cited by examiner

602 — Contacting a first part comprising a first material with a second part comprising all or a portion of a brazing sheet 604 — Brazing the first part to the second part by a process comprising at least one of controlled atmospheric brazing and vacuum brazing

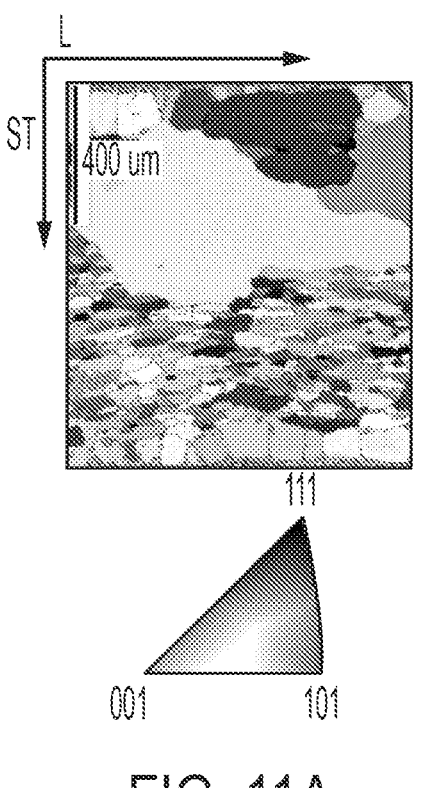
FIG. 11A
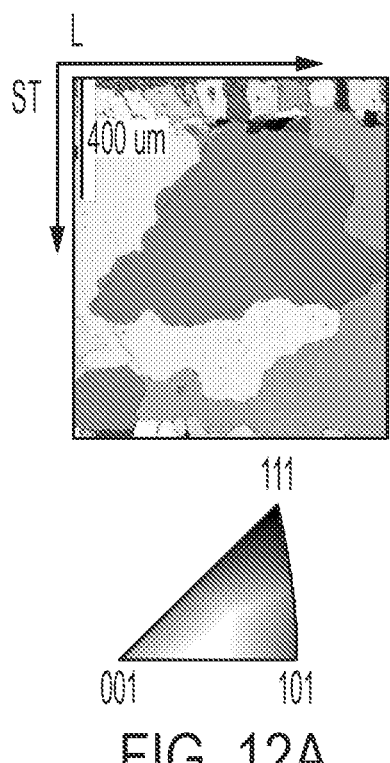
FIG. 12A
FIG. 11B
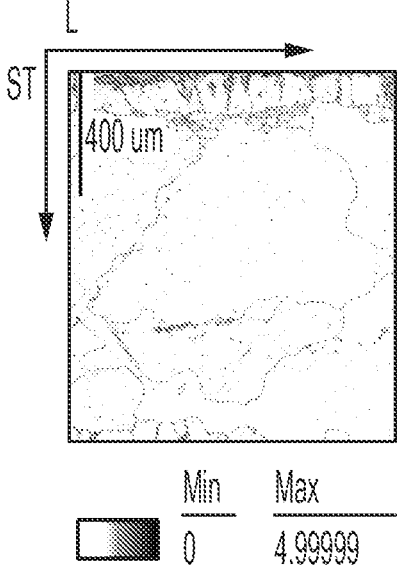
FIG. 12B

1500

1504
1506

1502

500 μm

1500

1504
1506

1502

500 μm

1600

1604
1606

1602

500 µm

1600

1604
1606

1602

500 µm

1702 — Homogenize the core layer

1704 — Hot work a workpiece comprising a 3XXX series aluminum alloy

1706 — Hot roll at least one brazing layer, at least one interliner layer, and a core layer together

1800

1804a
1806a

1802

1806b
1804b

1802

100 μm 1802 1800 1850 1800

1900

1904a

1906a

1902

1906b

1904b 1906a    1900

1902   1900   1906a   1950   1902   1900

BRAZING SHEETS, ARTICLES FORMED FROM BRAZING SHEETS, AND METHODS OF FORMING ARTICLES

CROSS-REFERENCE

This application claims benefit under 35 U.S.C. § 119 (e) to U.S. Provisional Application No. 63/228,740, filed Aug. 3, 2021 and U.S. Provisional Application No. 63/266,367, filed Jan. 4, 2022. The entire disclosures of which are hereby incorporated by reference.

FIELD OF USE

The present disclosure relates to brazing sheets, articles of manufacture formed from or including all or a portion of brazing sheets, and methods of forming articles of manufacture.

BACKGROUND

Various apparatus, such as, for example, heat exchangers, may be formed from stacked specially designed metal plates. Plate-type heat exchangers function by circulating two fluids (e.g., liquid, a refrigerant, or combinations thereof) on opposite sides of a plate, allowing heat exchange between the fluids, across the plate. To ensure that plate-type heat exchangers have acceptable corrosion resistance, the apparatus may be designed to resist corrosion attack along joints between plates and through the thickness of the sheet material used to form the plates. Increasing the resistance to corrosion attack in plate-type heat exchangers can present significant challenges.

SUMMARY

One non-limiting aspect according to the present disclosure is directed to a brazing sheet comprising a core layer, a brazing layer, and an interliner layer intermediate the core layer and the brazing layer. In various non-limiting embodiments, the brazing sheet has a construction that is suitable for at least one of controlled atmospheric brazing and vacuum brazing. The core layer of the brazing sheet is at least partially recrystallized, such that, for example, the core layer comprises a dislocation density no greater than 10,000,000 per cm². The interliner layer of the brazing sheet is unrecrystallized, such that, for example, the interliner layer does not comprise recrystallized grains that have a dislocation density no greater than 10,000,000 per cm². The core layer of the brazing sheet comprises a first aluminum alloy, such as, for example, a 3XXX series aluminum alloy or a 6XXX series aluminum alloy. For example, in certain non-limiting embodiments the first aluminum alloy comprises, in weight percentages based on the total weight of the first aluminum alloy: 0 to 1.2 silicon; 0 to 1.0 copper; 0 to 0.25 zirconium; 0 to 0.8 iron; 0 to 2.0 manganese; 0 to 3.0 zinc; 0 to 1.5 magnesium; 0 to 0.25 titanium; 0 to 0.3 chromium; 0 to 0.5 bismuth; aluminum; and impurities. The interliner liner of the brazing sheet comprises a second aluminum alloy. In various non-limiting embodiments, the second aluminum alloy comprises, in weight percentage based on the total weight of the second aluminum alloy, at least 0.01 zirconium. In various non-limiting embodiments, the first aluminum alloy comprises a first recrystallization temperature, the second aluminum alloy comprises a second recrystallization temperature, and the second recrystallization temperature is greater than the first recrystallization temperature. The brazing layer of the brazing sheet comprises a 4XXX series aluminum alloy. In various non-limiting embodiments, the brazing layer comprises a 4XXX series aluminum alloy comprising, in weight percentages based on total weight of the 4XXX series aluminum alloy: 5 to 15 silicon; 0 to 2.0 magnesium; 0 to 1.0 iron; 0 to 3.0 zinc; 0 to 2.0 copper; 0 to 1.0 manganese; 0 to 0.2 titanium; 0 to 0.3 bismuth; aluminum; and impurities. As used herein, the "recrystallization temperature" of a material is the lowest temperature at which at least 90% of the material will fully recrystallize when the material is heated at that temperature for a time period of no greater than 1 hour. The recrystallization temperature can be dependent on the material composition of the sheet material and the amount of strain in the grains of the sheet material.

Yet a further non-limiting aspect according to the present disclosure is directed to a method for forming the brazing sheet according to the present disclosure. The method comprises homogenizing a core layer to form a homogenized core layer, and hot working a workpiece comprising a 3XXX series aluminum alloy to form at least one interliner layer. The method further comprises hot rolling at least one brazing layer, the at least one interliner layer, and the homogenized core layer together to form the brazing sheet.

In certain non-limiting embodiments of a brazing sheet according to the present disclosure, the core layer of the brazing sheet comprises a first thickness in a range of 60% to 90% of a total thickness of the brazing sheet, an interliner layer of the brazing sheet comprises a second thickness in a range of 3% to 20% of the total thickness of the brazing Sheet, and a brazing layer of the brazing sheet comprises a third thickness in a range of 3% to 20% of the total thickness of the brazing sheet. In various non-limiting embodiments, the brazing sheet further comprises a second brazing layer and/or a second interliner layer.

An additional non-limiting aspect according to the present disclosure is directed to a heat exchanger comprising all or a portion of an embodiment of a brazing sheet according to the present disclosure. In certain non-limiting embodiments, the heat exchanger is an oil cooler or a liquid cooled condenser.

Yet a further non-limiting aspect according to the present disclosure is directed to a method for forming an article. The method comprises contacting a first part comprising a first material with a second part comprising all or a portion of an embodiment of a brazing sheet according to the present disclosure. The first part is coupled to the second part by a process comprising at least one of controlled atmospheric brazing and vacuum brazing. In various non-limiting embodiments, the first material comprises aluminum or an aluminum alloy. In certain non-limiting embodiments, the article is a heat exchanger, such as, for example, an oil cooler or a liquid cooled condenser.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of examples described herein, and the manner of attaining them, will become more apparent, and the examples will be better understood, by reference to the following description taken in conjunction with the accompanying drawing, wherein:

FIG. 11A is grain orientation map of a third sample that is at least partially recrystallized;

FIG. 11B is a KAM map of the third sample shown in FIG. 11A;

FIG. 12A is a grain orientation map of a fourth sample that is significantly recrystallized;

FIG. 12B is a KAM map of the fourth sample shown in FIG. 12A;

Figure 1:
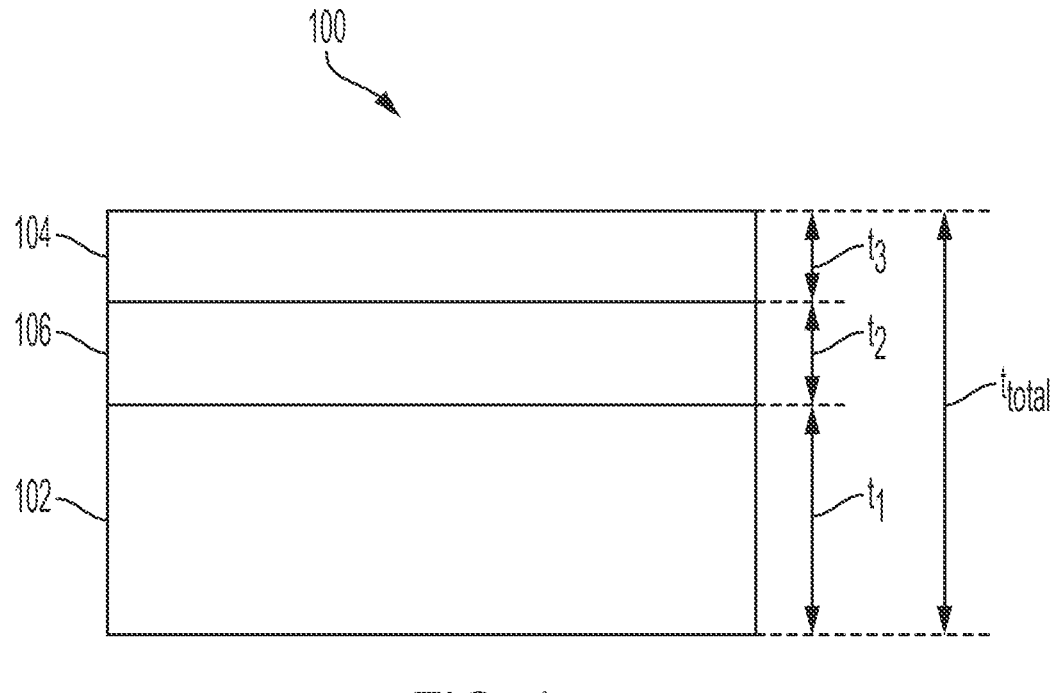
FIG. 1 is a schematic side elevational view of a non-limiting embodiment of a brazing sheet according to the present disclosure.

The exemplifications set out herein illustrate certain embodiments, in one or more forms, and such exemplifications are not to be construed as limiting the scope of the appended claims in any manner.

DETAILED DESCRIPTION

Various embodiments are described and illustrated herein to provide an overall understanding of the structure, function, and use of the disclosed articles and methods. The various embodiments described and illustrated herein are non-limiting and non-exhaustive. Thus, an invention is not limited by the description of the various non-limiting and non-exhaustive embodiments disclosed herein. Rather, the invention is defined solely by the claims. The features and characteristics illustrated and/or described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, the applicant reserves the right to amend the claims to affirmatively disclaim features or characteristics that may be present in the prior art. The various embodiments disclosed and described in this specification can comprise, consist of, or consist essentially of the features and characteristics as variously described herein.

Any references herein to "various embodiments", "some embodiments", "one embodiment", "an embodiment", "a non-limiting embodiment", or like phrases mean that a particular feature, structure, or characteristic described in connection with the example is included in at least one embodiment. Thus, appearances of the phrases "in various embodiments", "in some embodiments", "in one embodiment", "in an embodiment", "in a non-limiting embodiment", or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation. Such modifications and variations are intended to be included within the scope of the present embodiments.

An H-temper core layer in a brazing sheet normally is not homogenized, and it can develop a brown band, which can be resistant to corrosion. As used herein, H-temper has the meaning provided in ANSI H35.1/H35.1(M)-2017. The brown band can form in the core layer when silicon diffuses from a brazing layer to the core layer and forms precipitates with manganese and iron in solid solution during a brazing process. The brown band in the core layer can comprise small-scale $Al_xMn_ySi_z$ or $Al_x(Mn,Fe)_ySi_z$ dispersoids that form a band near the interface between the brazing layer and the core layer. The formation of dispersoids at the interface pulls manganese out of solid solution and creates a more electrochemically negative region in the brazing sheet that is anodic to the center of the brazing sheet, thereby increasing the overall corrosion resistance of the H-temper core layer. However, an H-temper core layer can have relatively poor formability properties, which can create challenges when incorporating the brazing sheet into manufactured products.

An O-temper core layer in a brazing sheet can be more formable (e.g., softer) than an H-temper core layer, which facilitates the manufacture of products incorporating the brazing sheet. As used herein, O-temper has the meaning provided in ANSI H35.1/H35.1(M)-2017. One example of a brazing sheet including an O-temper core layer is described in U.S. Pat. No. 7,255,932, which is hereby incorporated by reference herein. Although it has relatively favorable formability characteristics, an O-temper core layer may be more susceptible to corrosion than an H-temper core layer.

The present disclosure provides a brazing sheet that may have advantageous formability characteristics, corrosion resistance, and liquid film migration resistance. The brazing sheet can comprise a core layer, a brazing layer, and an interliner layer intermediate the core layer and the brazing layer. The core layer comprises a first aluminum alloy and can be at least partially recrystallized. The brazing layer comprises a 4XXX series aluminum alloy. The interliner layer comprises a second aluminum alloy and can be unrecrystallized.

As used herein, the term "core layer" refers to a substrate layer of the brazing sheet. In various non-limiting embodiments, the "core layer" can be disposed substantially in the center of a brazing sheet. However, the position of the core layer in a brazing sheet according to the present disclosure is not limited to the center of a brazing sheet. The core layer may or may not be covered on both of its faces with another layer of the brazing sheet and, for example, the core layer can be disposed and exposed on one side of the brazing sheet. Accordingly, in various non-limiting embodiments of brazing sheets herein, the core layer can be surrounded by other layers of the brazing sheet, have at least one side at least partially exposed, or have at least one side fully exposed.

Referring to FIG. 1, a brazing sheet 100 is provided. The brazing sheet 100 comprises a core layer 102, a brazing layer 104, and an interliner layer 106 disposed intermediate the core layer 102 and the brazing layer 104. In various non-limiting embodiments, the core layer 102, the interliner layer 106, and the brazing layer 104 are bonded together to form the brazing sheet 100. The brazing sheet 100 can have a composition and thickness suitable for at least one of controlled atmospheric brazing and vacuum brazing.

The brazing layer 104 of the brazing sheet 100 comprises an aluminum alloy, such as, for example, a 4XXX series aluminum alloy. In various non-limiting embodiments, the brazing layer 104 comprises an aluminum alloy comprising, in weight percentages based on total weight of the aluminum alloy: 5.0 to 15 silicon; 0 to 2.0 magnesium; 0 to 1.0 iron; 0 to 3.0 zinc; 0 to 2.0 copper; 0 to 1.0 manganese; 0 to 0.2 titanium; 0 to 0.3 bismuth; aluminum; and impurities.

The core layer 102 of the brazing sheet 100 comprises an aluminum alloy, such as, for example, a 3XXX series aluminum alloy or a 6XXX series aluminum alloy. In various non-limiting embodiments, the core layer 102 comprises a first aluminum alloy comprising, in weight percentages based on the total weight of the first aluminum alloy: 0 to 1.2 silicon; 0 to 1.0 copper; 0 to 0.25 zirconium; 0 to 0.8 iron; 0 to 2.0 manganese; 0 to 3.0 zinc; 0 to 1.5 magnesium; 0 to 0.25 titanium; 0 to 0.3 chromium; 0 to 0.5 bismuth; aluminum; and impurities.

The concentration of silicon present in an aluminum alloy can affect a recrystallization temperature of the aluminum alloy. In certain non-limiting embodiments, the first aluminum alloy comprises, in weight percentages based on the total weight of the first aluminum alloy, 0 to 0.6 silicon, 0 to 0.2 silicon, 0.05 to 1.2 silicon, 0.05 to 0.6 silicon, or 0.05 to 0.2 silicon. The core layer 102 can be at least partially recrystallized, and in various non-limiting embodiments the core layer 102 can be an O-temper core layer and/or homogenized.

Referring to FIG. 1, the interliner layer 106 of the brazing sheet 100 comprises an aluminum alloy, such as, for example, a second aluminum alloy comprising, in weight percentages based on the total weight of the second aluminum alloy: at least 0.01 zirconium; aluminum; and impurities. Zirconium in the aluminum alloy of the interliner layer 106 can inhibit recrystallization in the interliner layer 106. In various non-limiting embodiments, the interliner layer 106 of the brazing sheet 100 comprises a second aluminum alloy comprising, in weight percentages based on total weight of the aluminum alloy: 0.05 to 1.5 silicon; 0 to 2 copper; 0.01 to 0.5 zirconium; 0 to 0.8 iron; 0 to 2.0 manganese; 0 to 3.0 zinc; 0 to 2.0 magnesium; 0 to 0.3 titanium; 0 to 1.0 chromium; 0 to 0.5 bismuth; aluminum; and impurities. The interliner layer 106 can be homogenized or unhomogenized. In certain non-limiting embodiments, the interliner layer 106 comprises a composition suitable to form a brown band. The interliner layer 106 can be unrecrystallized and/or an H-temper interliner layer.

Silicon can reduce an aluminum alloy's resistance to recrystallization. The inventors of the present disclosure determined that there are various factors that can influence recovery and recrystallization kinetics of an aluminum alloy and thereby the recrystallization temperature of the aluminum alloy (e.g., reducing recovery and recrystallization kinetics increases the recrystallization temperature of the aluminum alloy). For example, stabilizing dislocation cores through reduction of the core stress field can influence the glide process and resulting recovery and recrystallization kinetics. In various non-limiting embodiments, solute that can inhibit recrystallization can comprise an atomic radius greater than aluminum (118 picometers (pm)), such as, for example, manganese (161 pm), chromium (166 pm), vanadium (171 pm), and zirconium (206 pm). While not intending to be bound by any particular theory, it is believed that the solute with a larger atomic radius can decorate dislocation cores and thereby reduce the tensile stresses and increase the activation barrier for dislocation glide, which can reduce recovery and recrystallization kinetics. In various non-limiting embodiments, silicon can be less effective at decreasing glide processes compared to manganese, chromium, vanadium, and zirconium as the atomic radius of silicon (111 pm) is actually smaller than the atomic radius of aluminum (118 pm). The inventors of the present disclosure determined that solute that is slower diffusing in aluminum than silicon can inhibit recrystallization in an aluminum alloy. Slower diffusing solute can reduce dislocation climb processes in the aluminum alloy and thereby reduce recovery and recrystallization kinetics. Increases in the stress field of the core can further destabilize the dislocation glide. Silicon can be a fast diffuser compared to manganese, chromium, vanadium, and zirconium and thereby silicon can enhance climb processes further increasing recovery and recrystallization kinetics.

Recovery of an aluminum alloy can require dislocation core rearrangement through glide and climb process kinetics into a defined cell structure. The defined cell structures can act as nucleation sites for formation of new crystal orientations within the deformed parent grain of the aluminum alloy. The recovery of an aluminum alloy can then lead to recrystallization of the aluminum alloy. The slower the solute present in the dislocation core diffuses and the larger its atomic radius, the greater the enhancement of the stabilization of the dislocation core can be, and the slower the aluminum alloy will recover. This can enable the use of thermal treatments on the aluminum alloy while maintaining the aluminum alloy in an unrecrystallized form.

Fast diffusing solute atoms (e.g., at least 60 μm diffusion distance at 600° C. in aluminum after 100 minutes), such as, for example, magnesium and zinc, can be less effective in reducing dislocation climb kinetics. Thus, fast diffusing solute may not significantly contribute to inhibition of recrystallization. Slow diffusing solute atoms (e.g., no greater than 10 μm diffusion distance at 600° C. in aluminum after 100 minutes), such as, for example, manganese, chromium, vanadium, zirconium, and titanium, can reduce dislocation climb kinetics if the slow diffusing solute is segregated to the dislocation core by their reduced mobility.

In various non-limiting embodiments, zirconium can form a nano-scaled $L1_2$ ordered simple cubic $Al_3Zr$ phase which can be effective in preventing motion and pinning straight grain boundary segments such that recrystallization in the aluminum alloy can be inhibited.

In certain non-limiting embodiments, the interliner layer 106 of the brazing sheet 100 comprises a 3XXX series aluminum alloy that can comprise a composition suitable to inhibit recrystallization of the interliner layer 106. For example, the 3XXX series aluminum alloy can comprise, in weight percentages based on the total weight of the 3XXX series aluminum alloy: 0.01 to 0.2 silicon; 0 to 0.6 copper; 0.8 to 1.9 manganese; 0 to 0.2 chromium; 0 to 0.15 zirconium; 0 to 0.4 iron; 0 to 3.0 zinc; 0 to 0.2 magnesium; 0 to 0.3 titanium; 0 to 0.1 vanadium; 0 to 0.5 bismuth; aluminum; and impurities. In various non-limiting embodiments, the 3XXX series aluminum alloy comprises, in weight percentages based on the total weight of the 3XXX series aluminum alloy: 0.02 to 0.2 silicon; 0.3 to 0.6 copper; 1.75 to 1.9 manganese; 0.1 to 0.2 chromium; 0 to 0.15 zirconium; 0.05 to 0.4 iron; 0 to 1.0 zinc; 0.01 to 0.1 magnesium; 0 to 0.3 titanium; 0 to 0.1 vanadium; 0 to 0.5 bismuth; aluminum; and impurities. In certain non-limiting embodiments, the 3XXX series aluminum alloy can comprise, in weight percentages based on the total weight of the aluminum alloy, at least 0.8 manganese, at least 1.0 manganese, at least 1.2 manganese, at least 1.4 manganese, at least 1.55 manganese, or at least 1.75 manganese.

As used herein, a brazing sheet layer that is "at least partially recrystallized" contains at least one recrystallized grain (e.g., the layer is greater than 0% recrystallized). A recrystallized grain is substantially undeformed and unstrained.

As used herein, a brazing sheet layer that is "unrecrystallized" does not contain grains that have recrystallized, i.e., the layer does not contain grains having a dislocation density no greater than 10,000,000 per $cm^2$. In certain non-limiting embodiments, the morphology of grains in an "unrecrystallized" layer may be in the as-worked condition. For example, unrecrystallized grains may still be elongated in an as-cold rolled condition and have the same crystallographic orientation as the rolling direction (longitudinal direction, L). Also, for example, an unrecrystallized material may comprise only deformed and strained grains.

Figure 4:
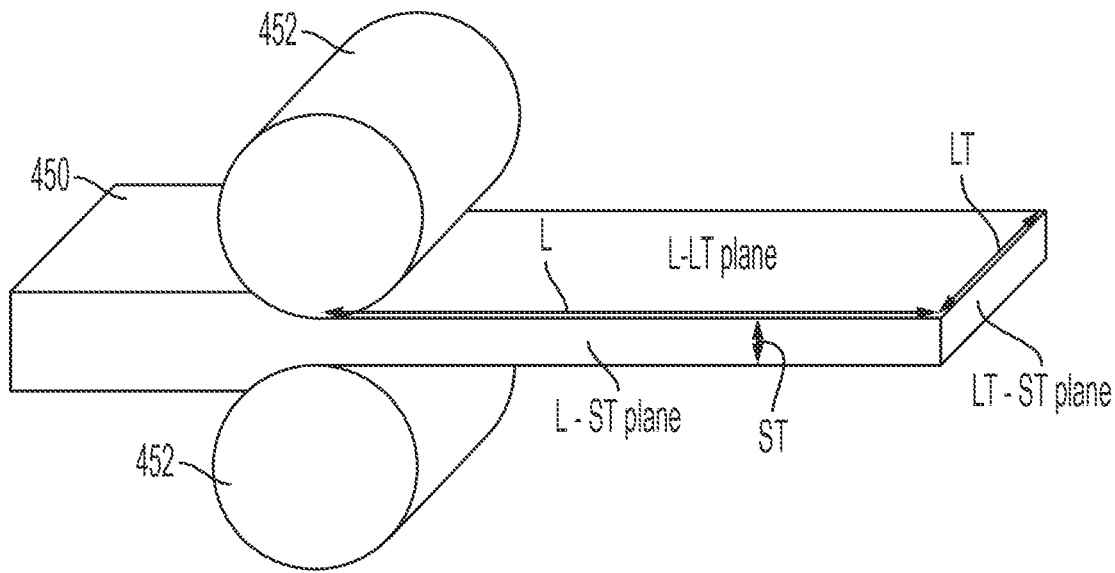
FIG. 4 is a schematic perspective view illustrating a non-limiting embodiment of cold rolling an embodiment of a material layer according to the present disclosure.

A material layer (e.g., a sheet) suitable for incorporation into a brazing sheet typically is cold worked during fabrication to reduce a thickness of the material, such as, for example, to reduce a thickness of the material by at least 80%, prior to annealing. For example, as illustrated in FIG. 4, the material layer 450 is cold rolled by rollers 452. To accommodate the reduction in thickness of the material layer 450, grains in the material layer 450 become elongated, resulting in an increased aspect ratio of the grains with respect to the longitudinal direction, L, (e.g., within the L-short transverse (ST) plane). As a result of the cold working, the grains change their crystallographic orientation (e.g., formation of crystallographic cold rolling texture) with respect to the longitudinal direction, L, (e.g., within the L-ST plane), and the grains experience an increase in dislocation density from less than 10,000,000 per $cm^2$ to greater than 10,000,000,000 per $cm^2$.

As deformation is typically a metastable and high-energy condition of the material layer 450, strain in the material layer 450 can be reduced during the final anneal. The strain reduction can be in the form of recovery only, wherein the grain morphology (e.g., elongated grains) and the cold rolling texture are retained, but the grain interior strain is reduced. Dislocations rearrange themselves and form a sub-cell structure in the grain interior. The overall dislocation density can be reduced, but no defect-free volumes of new grain orientations form.

During prolonged annealing or annealing with temperature gradients, the material layer 450 can recrystallize after it has recovered. During recrystallization, substantially defect-free volumes of new crystallographic orientation can nucleate from recovered grain internal sub-cells and/or from high angle grain boundaries segments adjacent to high strain concentrations that become mobile or form dispersoids. These nuclei subsequently grow and consume grains of high defect concentrations to form substantially defect-free, recrystallized grains of low dislocation densities (<10,000,000 per $cm^2$) and new crystallographic orientation (e.g., formation of crystallographic recrystallization texture).

Figure 5C:
FIG. 5C is a photomicrograph showing a cross-sectional side view of a portion of a material layer that comprises an aluminum alloy and is fully recrystallized.
Figure 5B:
FIG. 5B is a photomicrograph showing a cross-sectional side view of a portion of a material layer that comprises an aluminum alloy and is at least partially recrystallized.
Figure 5A:
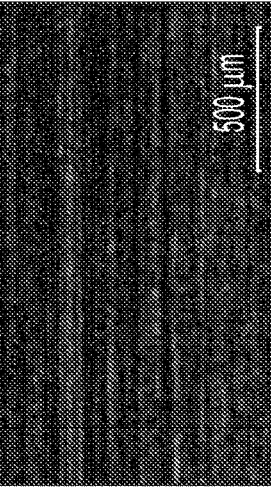
FIG. 5A is a photomicrograph showing a cross-sectional side view of a portion of a material layer that comprises an aluminum alloy and is unrecrystallized.

For example, FIG. 5A illustrates a cross section of the L-ST plane of a material layer that comprises only unrecrystallized grains after cold rolling. FIG. 5B illustrates a cross section of the L-ST plane of a material layer that has at least partially recrystallized after cold rolling and annealing. FIG. 5C illustrates a cross section of the L-ST plane of a material that has fully recrystallized after cold rolling and annealing.

Partial recrystallization of the interliner layer 106 can be difficult to control. As interfaces constitute discontinuities in the microstructure, they typically are also regions of high strain. One would expect that partial recrystallization would occur preferentially at the interface between the brazing layer 104 and interliner layer 106. The forming strain may subsequently be insufficient to guarantee that the recrystallized grain in the interliner layer 106 will again recrystallize during the heat up of the brazing cycle and, thus, the heat up can result in a less corrosion resistant interliner layer 106. Therefore, the interliner layer 106 is unrecrystallized.

In various non-limiting embodiments, a core layer 102 that is at least partially recrystallized can comprise a dislocation density no greater than 10,000,000 per cm², such as, for example, no greater than 5,000,000 per cm², or no greater than 1,000,000 per cm². For example, a core layer 102 that is at least partially recrystallized can comprise a dislocation density in a range of 10,000 to 10,000,000 per cm², such as, for example, 100,000 per cm² to 10,000,000 per cm², or 100,000 per cm² to 1,000,000 per cm².

As used herein, "dislocation density" means the mean average dislocation density of the material. Dislocation density can be measured using a transmission electron microscope and applying either the line-intercept method as described in Martin et al., "The quantitative measurement of dislocation density in the transmission electron microscope", Parkt. Metallogr. 32 (1995), p. 467, or the line-length measurement method as described in Kruml et al., "Dislocation density in Ni3(Al, Hf)", *Intermetallics* 8 (2000), p. 729, both of which are hereby incorporated herein by reference in their entireties.

In various non-limiting embodiments, an interliner layer 106 that is unrecrystallized can comprise an average dislocation density greater than 100,000,000 per cm², such as, for example, greater than 1,000,000,000 per cm², greater than 10,000,000,000 per cm², or greater than 100,000,000,000 per cm². For example, an interliner layer 106 that is unrecrystallized can comprise a dislocation density in a range of 100,000,000 per cm² to 1,000,000,000,000 per cm², such as, for example, 1,000,000,000 per cm² to 1,000,000,000,000 per cm², or 10,000,000,000 per cm² to 1,000,000,000,000 per cm².

Figure 13:
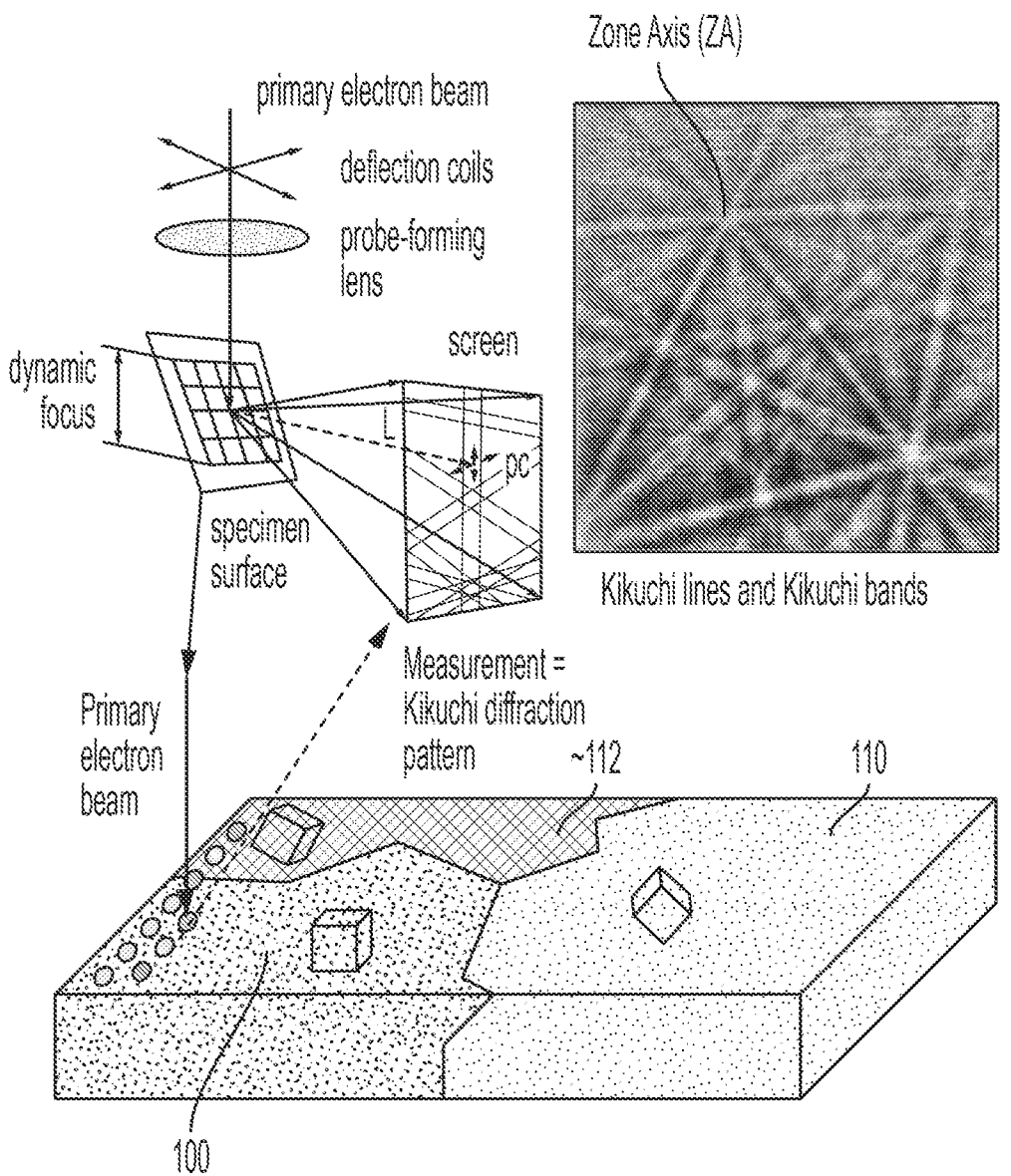
FIG. 13 is a system diagram illustrating how the electron beam of a scanning electron microscope scans a surface of a sample layer and obtains a Kikuchi Pattern from each discrete sampling spot.

In certain non-limiting embodiments, electron backscatter diffraction (EBSD) utilizing a scanning electron microscope (SEM) can be used to determine whether or not a layer is recrystallized or at least partially recrystallized. In EBSD, the electron beam of the SEM scans a surface of a sample layer and obtains from each discrete sampling spot a Kikuchi pattern, as illustrated in the system diagram example in FIG. 13. Each orientation of a crystal that is unique in symmetry in the sample layer can have a unique Kikuchi pattern, and each Kikuchi pattern can be indexed by comparing the obtained Kikuchi pattern with a database of Kikuchi patterns. Areas of the same orientation based on the Kikuchi pattern within a defined orientation spread are then identified as a contiguous grain. An orientation map is then created by assigning a color to each grain based on its orientation.

Figure 14:
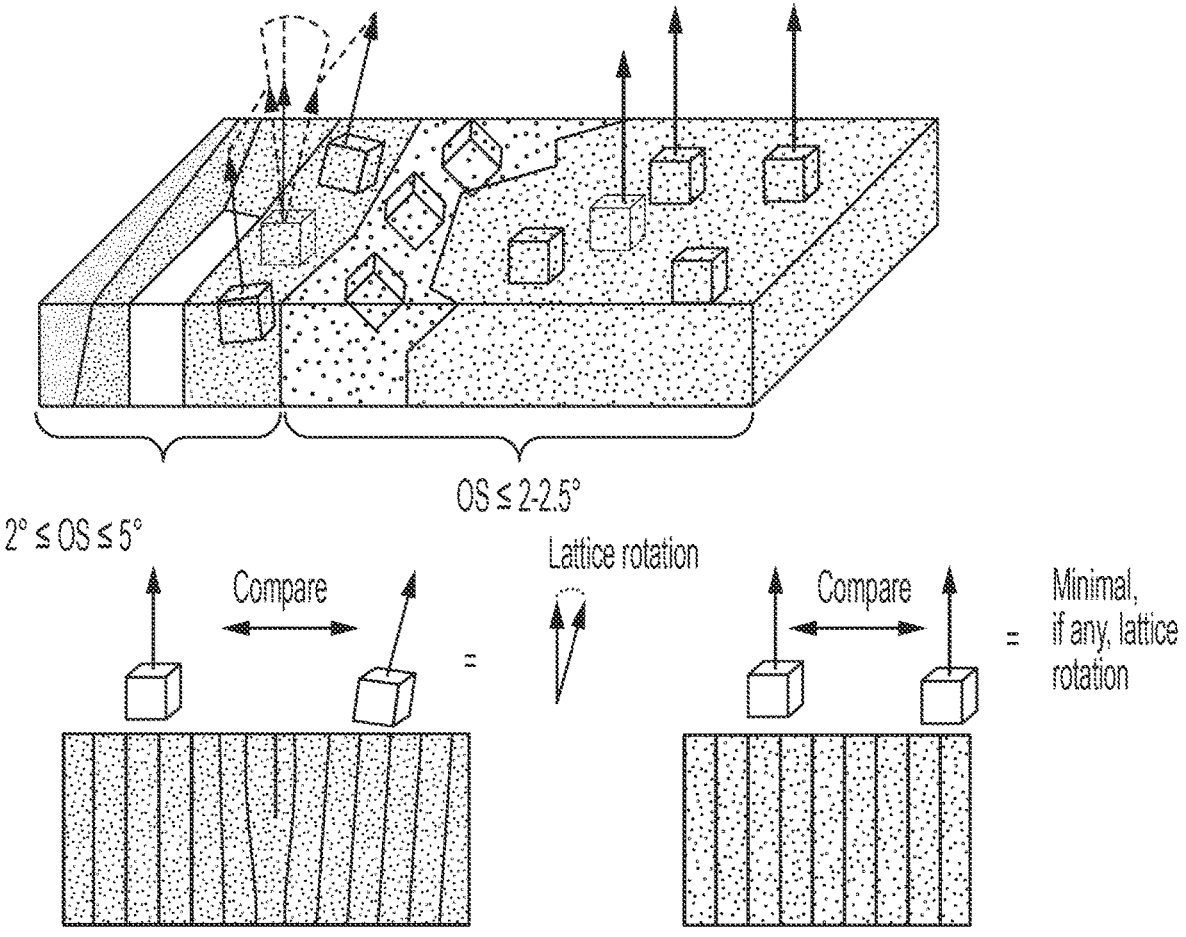
FIG. 14 is a system diagram illustrating how EBSD can be used to produce KAM maps based on misorientations between data points to determine the strain of a sample.

Strain in a sample layer can create a lattice rotation that can be measured by EBSD. If there is minimal, if any, lattice rotation, the sample layer is recrystallized. In various non-limiting embodiments, EBSD can be used to produce kernel average misorientation (KAM) maps based on misorientations between data points to determine the strain of a sample layer, as illustrated by the system diagram example in FIG. 14. For a KAM map, the misorientation between data points is quantified based on orientation spread (OS) and is color coded in the map based on the OS. For example, a layer with an OS less than or equal to 2.5 degrees can be considered recrystallized, while a layer with an OS greater than 2.5 degrees can be considered unrecrystallized. In various non-limiting embodiments, a layer with an OS less than or equal to 2.0 degrees can be considered recrystallized, while a layer with an OS greater than 2.0 degrees can be considered unrecrystallized. In certain non-limiting embodiments, quantitative misorientation can be obtained from line trace analyses.

As illustrated in FIGS. 9A, 10A, 11A, and 12A, the grain orientation maps may include a legend illustrating the color of each grain orientation. As illustrated in FIGS. 9B, 10B, 11B, and 12B, the KAM maps have a scale of 0 OS (yellow) that indicates minimal if any strain in the sample layer to 4.99999 OS (black) that indicates significant strain in the sample layer. The data in FIGS. 9A-9B, 10A-10B, 11A-11B, and 12A-12B was procured using a 0.5 micron step size.

Figures 9A, 9B, 10A, 10B:
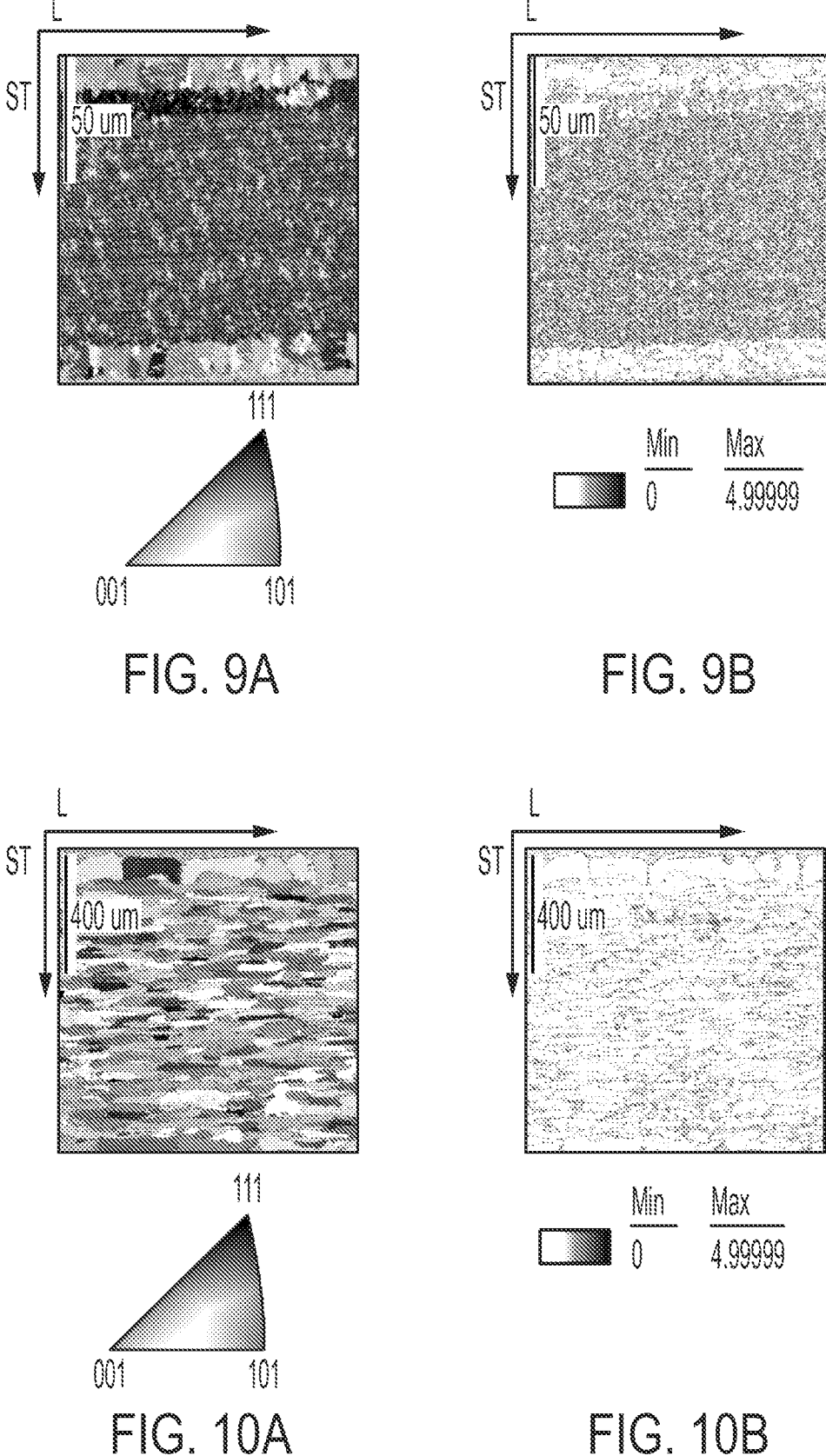
FIG. 9A is a grain orientation map of a first sample that is unrecrystallized.
FIG. 9B is a kernel average misorientation (KAM) map of the first sample shown in FIG. 9A.
FIG. 10A is a grain orientation map of a second sample that is unrecrystallized.
FIG. 10B is a KAM map of the first sample shown in FIG. 10A.

For example, a grain orientation map of a first sample (a cold rolled composite) that is unrecrystallized is shown in FIG. 9A, and a KAM map of the first sample is shown in FIG. 9B. As illustrated in FIGS. 9A-9B, the grains in the first sample are mainly elongated, and as illustrated in FIG. 9B, the KAM map shows predominantly high OS (orange-red) regions, showing that the first sample is unrecrystallized.

A grain orientation map of a second sample (cold rolled and annealed) that is unrecrystallized is shown in FIG. 10A, and a KAM map of the second sample is shown in FIG. 10B. As illustrated in FIGS. 10A-10B, the grains in the second sample are mainly elongated, and as illustrated in FIG. 10B, the KAM map shows high OS (orange) regions which however exhibit less than the OS in FIG. 9B, showing that the second sample is unrecrystallized and recovered.

A grain orientation map of a third sample that is at least partially recrystallized is shown in FIG. 11A, and a KAM map of the third sample is shown in FIG. 11B. As illustrated in FIGS. 11A-11B, the grains are a mixture of smaller elongated grains that are mainly recovered. In FIG. 11B, the KAM map shows some OS (orange), and some crystals have grown that are essentially strain-free, with minimal OS (yellow).

A grain orientation map of a fourth sample that is significantly recrystallized is shown in FIG. 12A, and a KAM map of the fourth sample is shown in FIG. 12B. As illustrated in FIGS. 12A-12B, the grains are large and have regrown. In FIG. 12B, the KAM map shows minimal OS (yellow), indicating the fourth sample is significantly recrystallized.

Figure 15A:
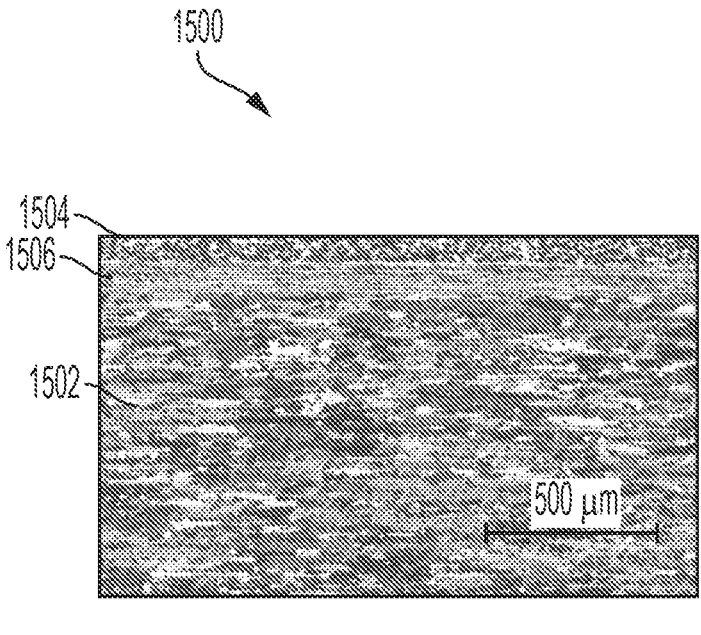
FIG. 15A is a grain orientation map of a non-limiting embodiment of a brazing sheet according to the present disclosure.
Figure 15B:
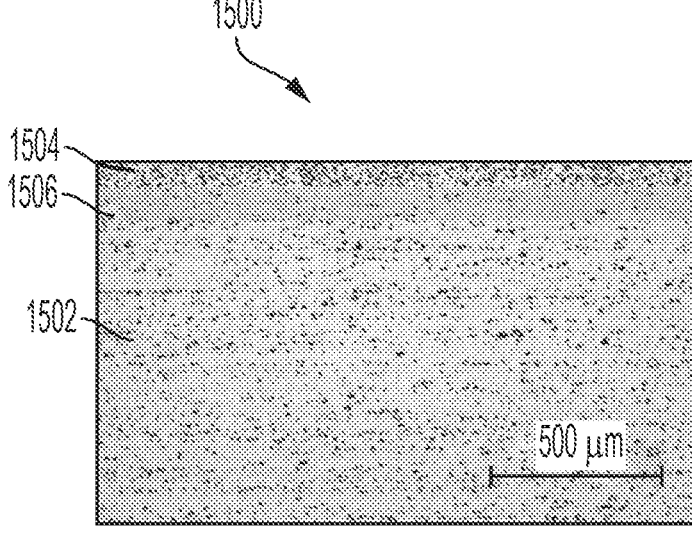
FIG. 15B is a KAM map of the brazing sheet shown in FIG. 15A.

A grain orientation map of a non-limiting embodiment of a first brazing sheet 1500 according to the present disclosure is shown in FIG. 15A, and a KAM map of the first brazing sheet 1500 is shown in FIG. 15B. As shown by FIGS. 15A-15B, a core layer 1502 of the first brazing sheet 1500 is at least partially recrystallized. An interliner layer 1506 is intermediate the core layer 1502 and the brazing layer 1506. The interliner layer 1506 is unrecrystallized. The core layer 1502 comprises a first aluminum alloy, the brazing layer 1504 comprises a 4XXX series aluminum alloy, and the interliner layer 1506 comprises a second aluminum alloy.

Figure 16A:
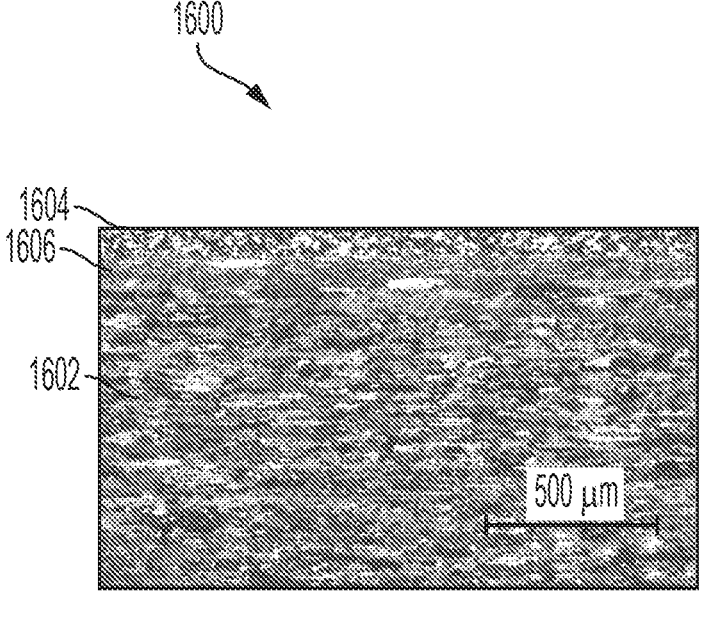
FIG. 16A is a grain orientation map of a non-limiting embodiment of a brazing sheet according to the present disclosure.
Figure 16B:
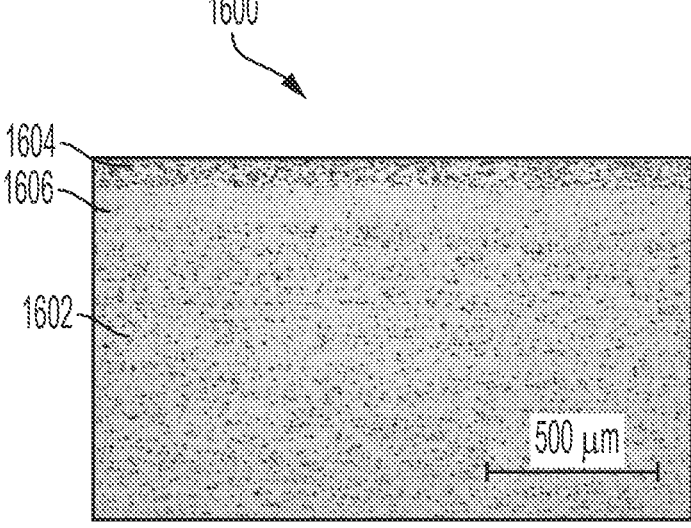
FIG. 16B is a KAM map of the brazing sheet shown in FIG. 16A.

A grain orientation map of a non-limiting embodiment of a second brazing sheet 1600 according to the present disclosure is shown in FIG. 16A, and a KAM map of the second brazing sheet 1600 is shown in FIG. 16B. As shown by FIGS. 16A-16B, a core layer 1602 of the first brazing sheet 1600 is at least partially recrystallized. An interliner layer 1606 is intermediate the core layer 1602 and the brazing layer 1604. The interliner layer 1606 is at least partially recrystallized. The core layer 1602 comprises a first aluminum alloy, the brazing layer 1604 comprises a 4XXX series aluminum alloy, and the interliner layer 1606 comprises a second aluminum alloy.

Figure 18A:
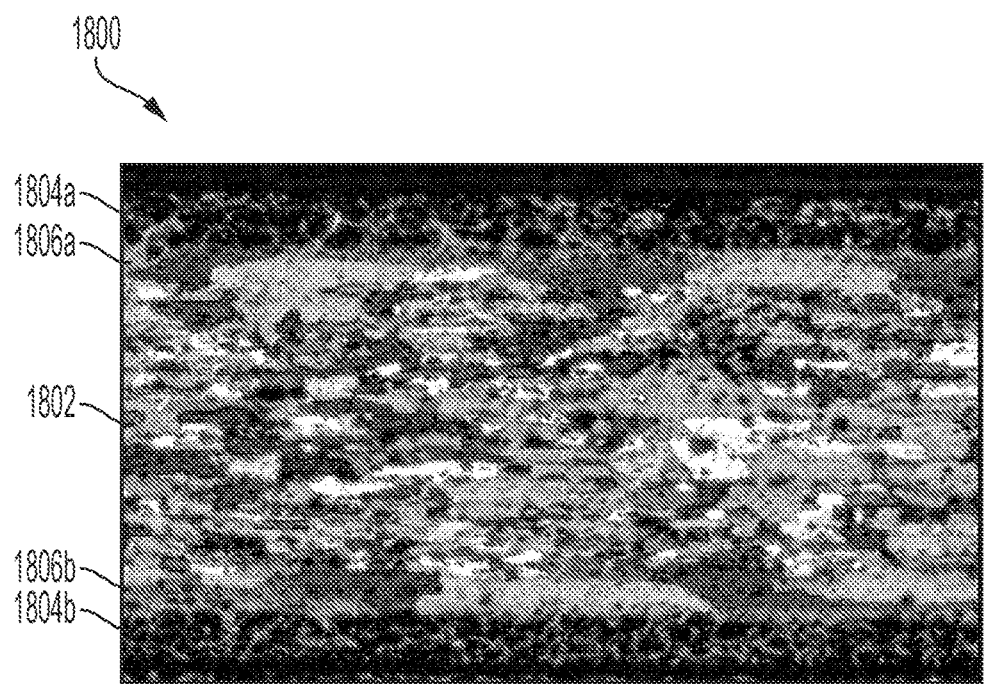
FIG. 18A is a grain orientation map of a comparative brazing sheet, as fabricated, that comprises an O-temper interliner layers that are at least partially recrystallized.
Figure 18B:
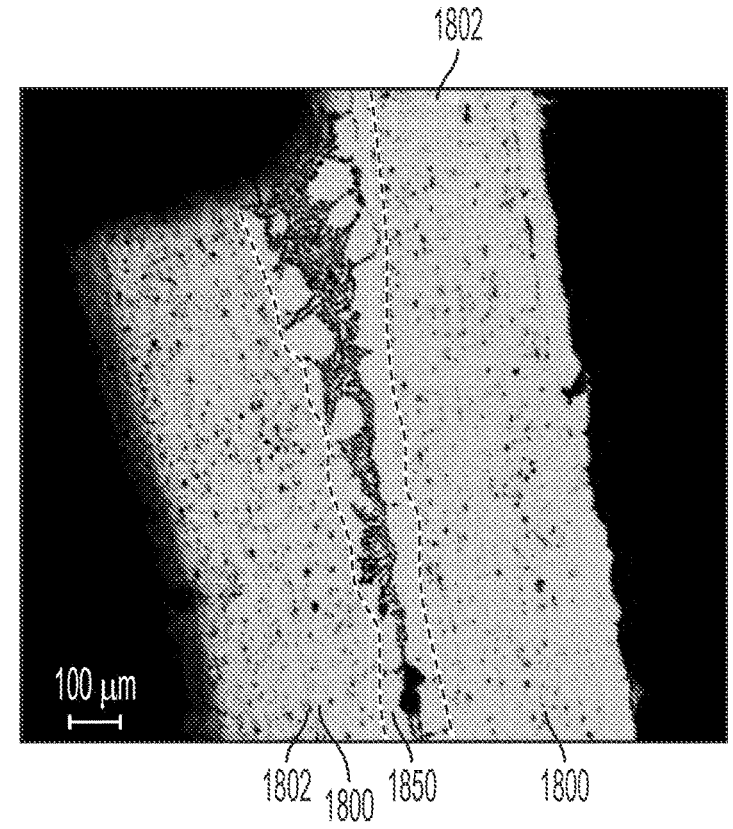
FIG. 18B provides photomicrographs showing a cross-sectional side view of a portion of two comparative brazing sheets of FIG. 18A, after a brazing process where dashed lines indicate the joint width.

Referring to FIG. 18A, a grain orientation map of a comparative brazing sheet 1800, as fabricated, that comprises a first O-temper interliner layer 1806a that is at least partially recrystallized, a second O-temper interliner layer 1806b that is at least partially recrystallized, an O-temper core layer 1802, a first brazing layer 1804a comprising a 4XXX series aluminum alloy, and a second brazing layer 1804b comprising a 4XXX series aluminum alloy. Referring to FIG. 18B, two of the brazing sheets 1800 were contacted together and subjected to a brazing process resulting in a brazing joint 1850.

Figure 19A:
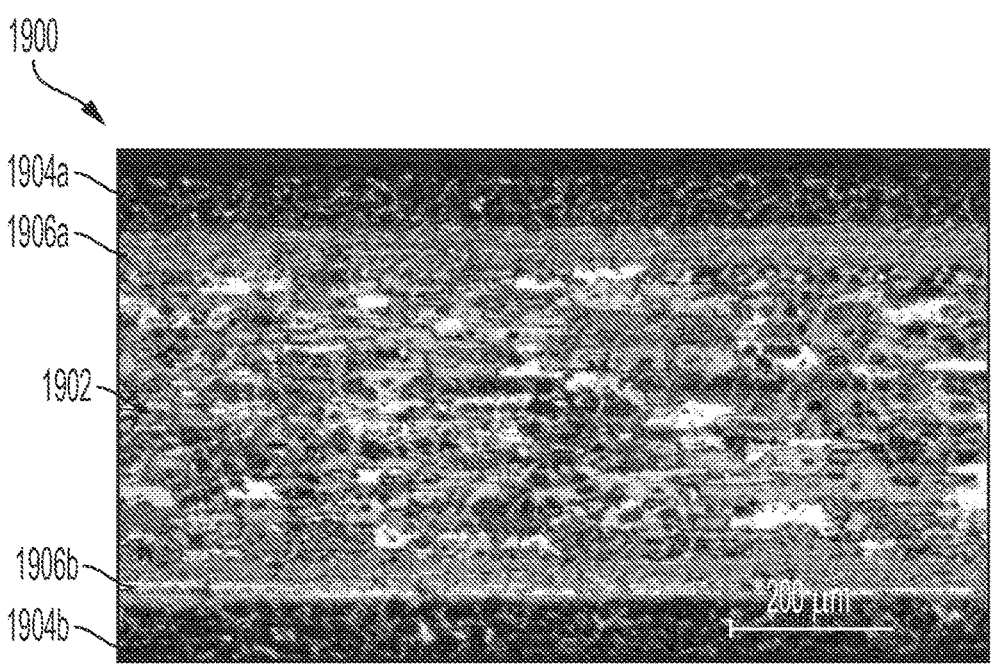
FIG. 19A is a grain orientation map of a non-limiting embodiment of a brazing sheet, as fabricated, that comprises an H-temper interliner layers that are unrecrystallized.
Figure 19B:
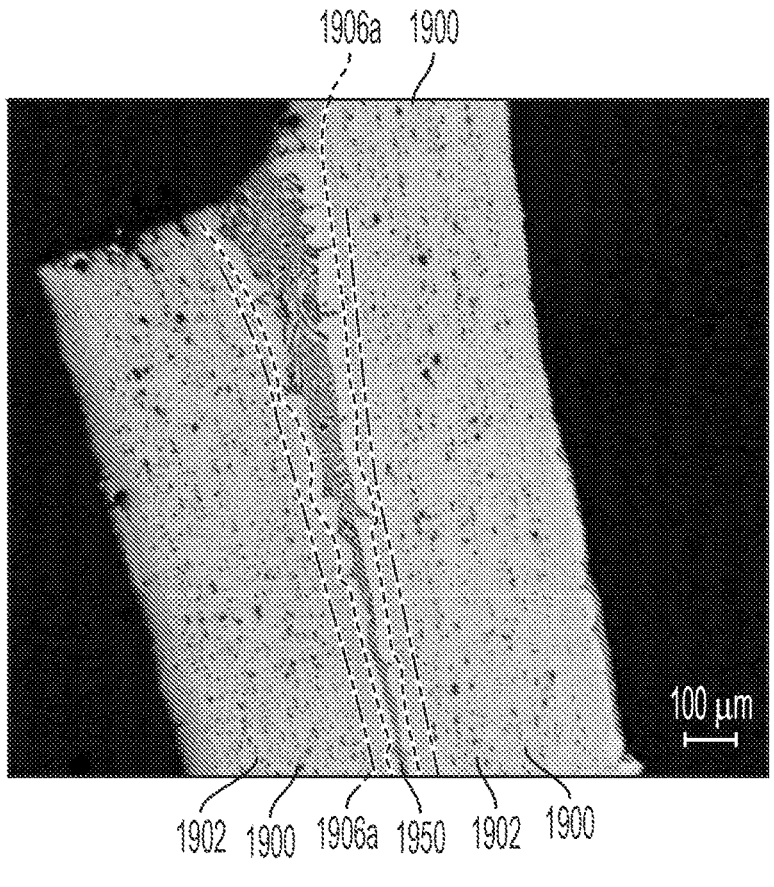
FIG. 19B provides photomicrographs showing a cross-sectional side view of a portion of two brazing sheets of FIG. 19A, after a brazing process where dashed lines indicate brown bands.

Referring to FIG. 19A, a grain orientation map of a brazing sheet 1900 according to the present disclosure, as fabricated, that comprises a first H-temper interliner layer 1906a that is unrecrystallized, a second H-temper interliner layer 1906b that is unrecrystallized, an O-temper core layer 1902, a first brazing layer 1904a comprising a 4XXX series aluminum alloy, and a second brazing layer 1904b comprising a 4XXX series aluminum alloy. Referring to FIG. 19B, two of the brazing sheets 1900 were contacted together and subjected to a brazing process resulting in a brazing joint 1950. The interliner layers 1904a remain discernable in FIG. 19B after the brazing process where the interliner layers 1804a are no longer discernable from the rest of the comparative brazing sheets 1800 in FIG. 18B. It was observed that the interliner layers 1904a in FIG. 19B contained a fine dispersion and a brown brand. The joint width in FIG. 19B is substantially narrower than the joint width in FIG. 19A, indicating that less liquid film migration occurred in FIG. 19B compared to FIG. 19A.

In various non-limiting embodiments, the interliner layer of a brazing sheet according to the present disclosure (e.g., brazing sheet 100) is configured to inhibit liquid film migration. For example, the interliner layer (e.g., interliner layer 106) can be an unhomogenized material with a strain that can inhibit liquid film migration (e.g., dissolution into the brazing layer upon liquification) during a brazing cycle. For example, the deformed and strained grains in the interliner layer (e.g., interliner layer 106) can recrystallize during heat up in the brazing cycle prior to the onset of melting of the braze liner and thereby protect the core layer (e.g., core layer 102) from liquid film migration, even if the core layer does not fully recrystallize. In various non-limiting embodiments, if the interliner layer is unhomogenized and comprises at least 0.01 weight percent manganese in solid solution, $Al_xMn_ySi_z$ dispersoids and a brown band may form in the interliner layer during the brazing cycle. Thus, the brazing sheet (e.g., brazing sheet 100) can comprise the formability of an O-temper material because of a homogenized O temper core layer (e.g., core layer 102), which typically is the thickest portion of the brazing sheet, along with the enhanced corrosion protection of an unhomogenized and unrecrystallized material because of the interliner layer (e.g., interliner layer 106), which can inhibit corrosion of the core layer.

In certain non-limiting embodiments of a brazing sheet according to the present disclosure (e.g., brazing sheet 100), the grains of the core layer (e.g., core layer 102) comprise a first aspect ratio and the grains of the interliner layer (e.g., interliner layer 106) comprise a second aspect ratio in the final temper (e.g. after fabrication is complete after the final heat treatment). In various non-limiting embodiments of the brazing sheet, the second aspect ratio can be greater than the first aspect ratio, such as, for example, at least 0.1 greater, at least 0.5 greater, at least 1 greater, or at least 2 greater than the first aspect ratio. As used herein, the "aspect ratio" of a material refers to the ratio of mean length to grain height measured in the length to short transverse (L-ST) plane. In various non-limiting embodiments, the grains of the core layer of a brazing sheet according to the present disclosure are near equiaxed or equiaxed in the final temper.

In various non-limiting embodiments of a brazing sheet according to the present disclosure (e.g., brazing sheet 100), the core layer (e.g., core layer 102) can comprise an aluminum alloy having a first recrystallization temperature, and the interliner layer (e.g., interliner layer 106) of the brazing sheet can comprise an aluminum alloy having a second recrystallization temperature. In various embodiments of the brazing sheet according to the present disclosure, the second recrystallization temperature can be greater than the first recrystallization temperature, such as, for example, at least 5 degrees Celsius greater, at least 10 degrees Celsius greater, at least 25 degrees Celsius greater, at least 50 degrees Celsius greater, or at least 100 degrees Celsius greater than the first recrystallization temperature. An annealing heat treatment temperature can be applied to the brazing sheet according to the present disclosure such that the core layer can fully recrystallize while the interliner layer may not recrystallize (e.g., remain unrecrystallized) but may recover during the annealing heat treatment.

The thickness of each layer in various embodiments of a brazing sheet according to the present disclosure (e.g., brazing sheet 100) can be configured based on the desired structural properties of the article of manufacture to be produced from or that is to incorporate all or a portion of the brazing sheet. For example, in various non-limiting embodiments, the core layer (e.g., core layer 102) can comprise a first thickness, $t_1$, that can be in a range of 60% to 90% of a total thickness (i.e., $t_{total}$) of the brazing sheet. In various non-limiting embodiments, the interliner layer (e.g., interliner layer 106) can comprise a second thickness, $t_2$, that is in a range of 3% to 20% of the total thickness ($t_{total}$) of the brazing sheet. In various non-limiting embodiments, the brazing layer (e.g., brazing layer 104) can comprise a third thickness, $t_3$, that is in a range of 3% to 20% of the total thickness ($t_{total}$) of the brazing sheet. In various non-limiting embodiments, the first thickness, $t_1$, is greater than the second thickness, $t_2$, and also is greater than the third thickness, $t_3$. In certain non-limiting embodiments, the total thickness ($t_{total}$) of the brazing sheet according to the present disclosure (e.g., brazing sheet 100) is in a range of 100 μm to 5 mm, such as, for example, in a range of 200 μm to 1 mm.

In various non-limiting embodiments, a brazing sheet according to the present disclosure may comprise layers in addition to a core layer, an interliner layer, and a brazing layer. For example, referring to the non-limiting embodiment shown schematically in FIG. 2, a brazing sheet 200 comprises core layer 202, a first interliner layer 206a, a first brazing layer 204a, a second brazing layer 204b, and a second interliner layer 206b. In various non-limiting embodiments, the core layer 202, the first interliner layer 206a, the second interliner layer 206b, the first brazing layer 204a, and the second brazing layer 204b are bonded together to form the brazing sheet 200. The brazing sheet 200 can be suitable for at least one of controlled atmospheric brazing and vacuum brazing. For example, the brazing sheet 200 can comprise layers having compositions so that the brazing sheet is suitable for controlled atmospheric brazing and/or vacuum brazing.

Figure 2:
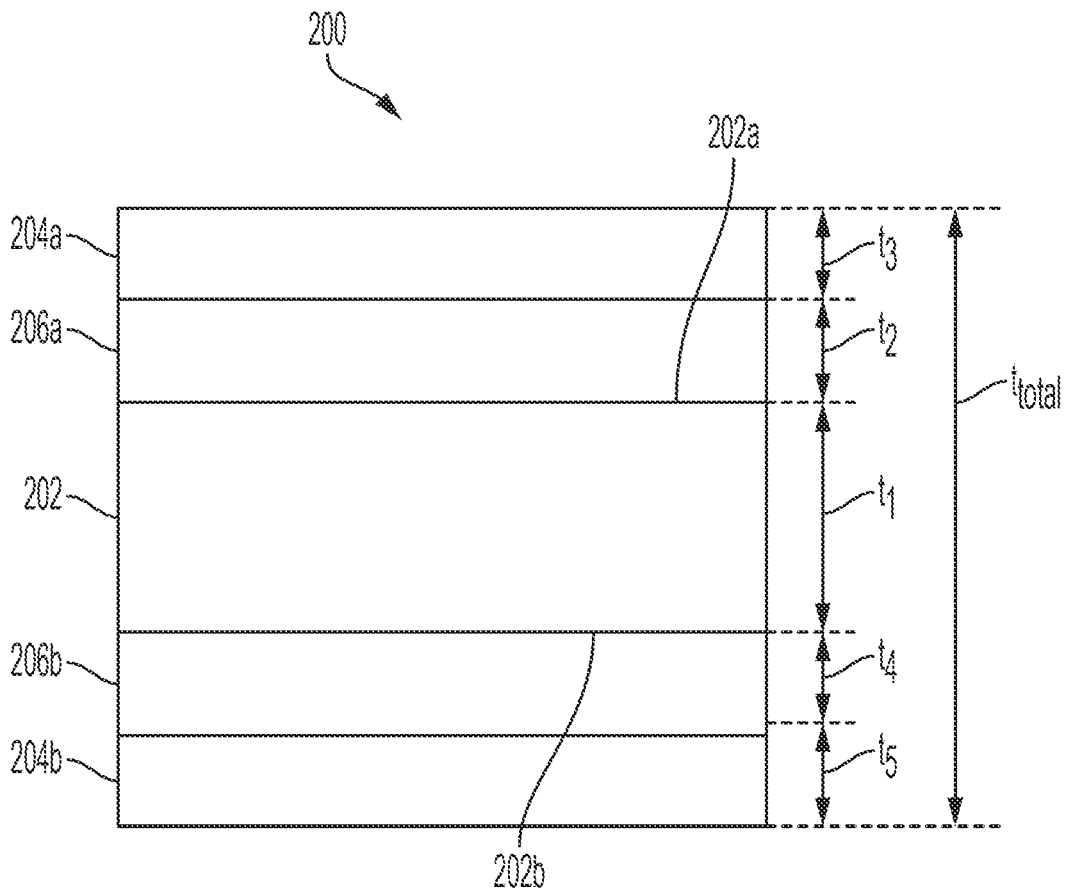
FIG. 2 is a schematic side elevational view of a non-limiting embodiment of a brazing sheet according to the present disclosure.

As shown in FIG. 2, the second brazing layer 204b is disposed on a second side 202b of core layer 202, and the first brazing layer 204a is disposed on a first side 202a of the core layer 202. The second side 202b of the core layer 202 is disposed opposite the first side 202a of the core layer 202. In various non-limiting embodiments, the first brazing layer 204a and/or the second brazing layer 204b can be configured with a composition as described herein with respect to the brazing layer 104. In various non-limiting embodiments, a composition of the second brazing layer 204b can be the same as or different from a composition of the first brazing layer 204a. For example, the second brazing layer 204b can comprise 1XXX series aluminum alloy, a 3XXX series aluminum alloy, a 3XXX series aluminum alloy (e.g., a 3XXX series aluminum alloy with a purposeful addition of zinc (e.g., 0.1 to 4, in weight percentages based on total weight of the aluminum alloy), a 3XXX series aluminum alloy without a purposeful addition of zinc), a 4XXX series aluminum alloy or a 7XXX series aluminum alloy. Similarly, the first interliner layer 206a and/or the second interliner layer 206b can be configured with a composition as described herein with respect to interliner layer 106. In various non-limiting embodiments, a composition of the second interliner layer 206b can be the same as or different from a composition of the first interliner layer 206a.

The second interliner layer 206b can be disposed intermediate the core layer 202 and the second brazing layer 204b. The second interliner layer 206b can be unrecrystallized, and in various non-limiting embodiments the second interliner layer 206b can be unhomogenized.

A thickness of each layer in the brazing sheet 200 can be configured based on the desired structural properties of the article to be produced from or that is to incorporate all or a portion of the brazing sheet 200. For example, in various non-limiting embodiments, the core layer 202 can comprise a first thickness, $t_1$, that can be in a range of 60% to 90% of a total thickness ($t_{total}$) of the brazing sheet 200. In various non-limiting embodiments the first interliner layer 206a and second interliner layer 206b can comprise a combined thickness, $t_2+t_4$, that is in a range of 3% to 20% of the total thickness ($t_{total}$) of the brazing sheet 200. In various non-limiting embodiments, the first brazing layer 204a and the second brazing layer 204b can comprise a combined thickness, $t_3+t_5$, that is in a range of 3% to 20% of the total thickness ($t_{total}$) of the brazing sheet 200. In certain non-limiting embodiments, the total thickness ($t_{total}$) of the brazing sheet 200 is in a range of 100 μm to 5 mm, such as, for example, in a range of 200 μm to 1 mm.

In various non-limiting embodiments, a brazing sheet may not comprise a second interliner layer and a second brazing layer may be in direct contact with the core layer. Referring to the non-limiting embodiment shown schematically in FIG. 3, a brazing sheet 300 comprises core layer 302, an interliner layer 306, a first brazing layer 304a, and a second brazing layer 304b. In various non-limiting embodiments, the core layer 302, the interliner layer 306, the first brazing layer 304a, and the second brazing layer 304b are bonded together to form the brazing sheet 300. The brazing sheet 300 can be suitable for at least one of controlled atmospheric brazing and vacuum brazing. For example, the brazing sheet 300 can comprise layers having compositions so that the brazing sheet is suitable for controlled atmospheric brazing and/or vacuum brazing.

Figure 3:
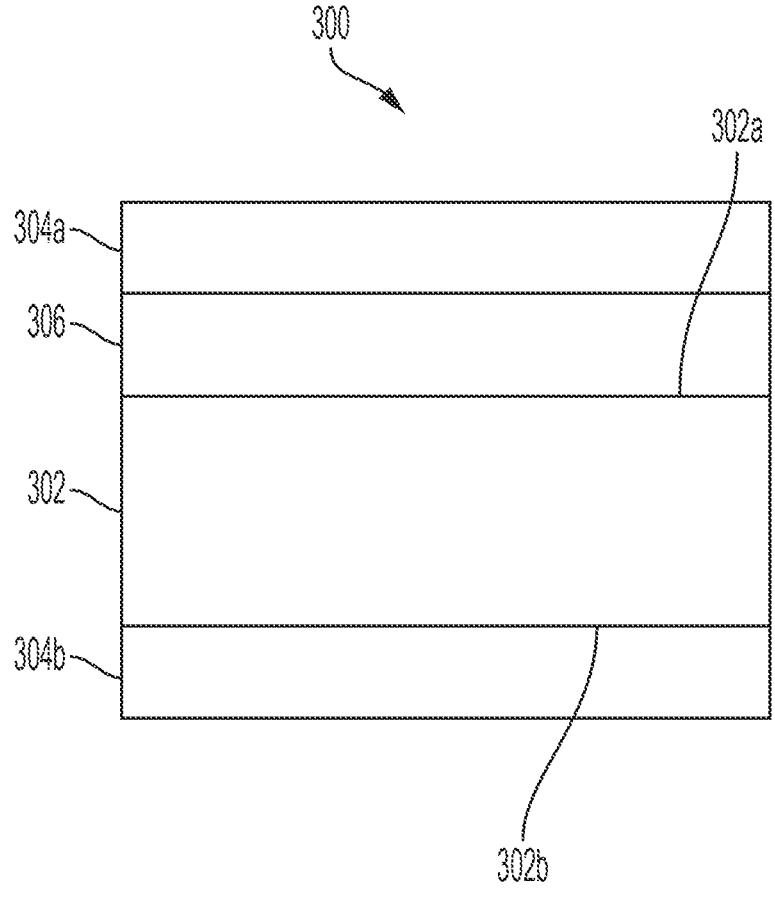
FIG. 3 is a schematic side elevational view of a non-limiting embodiment of a brazing sheet according to the present disclosure.

As shown in FIG. 3, the second brazing layer 304b is disposed on a second side 302b of core layer 302, and the first brazing layer 304a is disposed on a first side 302a of the core layer 302. The second side 302b of the core layer 302 is disposed opposite the first side 302a of the core layer 302. In various non-limiting embodiments, the first brazing layer

304a and/or the second brazing layer 304b can be configured with a composition as described herein with respect to the brazing layer 104. In various non-limiting embodiments, a composition of the second brazing layer 304b can be the same as or different from a composition of the first brazing layer 304a. Similarly, the interliner layer 306 can be configured with a composition as described herein with respect to interliner layer 106.

Figure 17:
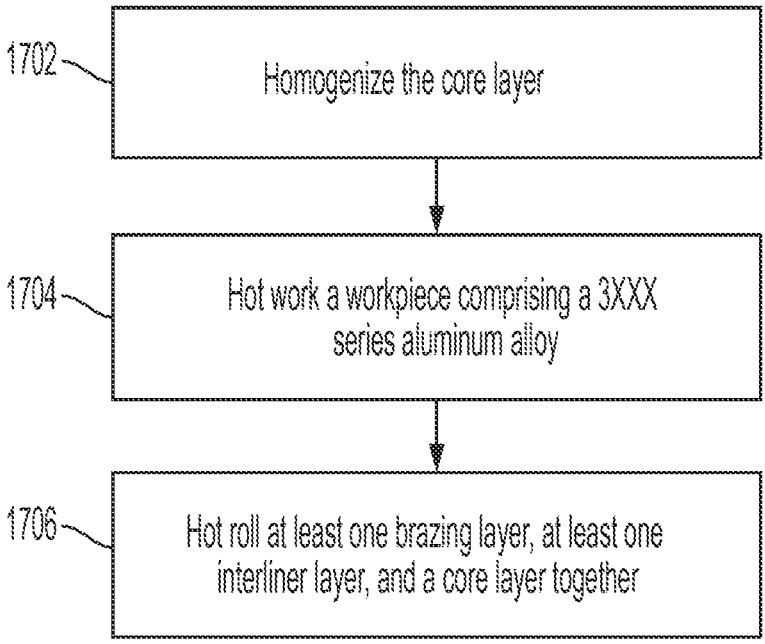
FIG. 17 is a block diagram of a non-limiting embodiment of a method according to the present disclosure for forming a brazing sheet.

FIG. 17 is a block diagram of a non-limiting embodiment of a method according to the present disclosure for forming a non-limiting embodiment of a brazing sheet according to the present disclosure. The method can comprise homogenizing the core layer to form a homogenized core layer (step 1702). A workpiece comprising a 3XXX series aluminum alloy can be hot worked (e.g., hot rolled into an intermediate gauge sheet material) to form an interliner layer (step 1704). The method can further comprise hot rolling a stack or assembly including the homogenized core layer from step 1702, one or more interliner layers from step 1704, and one or more brazing layers together to form the brazing sheet (step 1706). For example, a stack including the homogenized core layer from step 1702, at least one interliner layer from step 1704, and at least one brazing layer and is assembled in a proper sequence, heated, and then hot rolled to bond the layers together and form a brazing sheet. During the process, conventional interliner layers are likely to be at least partially recrystallized during fabrication of the brazing sheet than a conventional core layer. Embodiments of an interliner layer according to the present disclosure processed in this way may remain unrecrystallized during production of the brazing sheet.

In various non-limiting embodiments, an article of manufacture, such as, for example, a heat exchanger, can include a structural element comprising all or a portion of a brazing sheet embodiment according to the present disclosure (e.g., any of brazing sheets 100, 200, 300). In various embodiments a heat exchanger that is, for example, an oil cooler or a liquid cooled condenser, includes all or a portion of a brazing sheet embodiment according to the present disclosure (e.g., any of brazing sheets 100, 200, 300).

Figure 6:
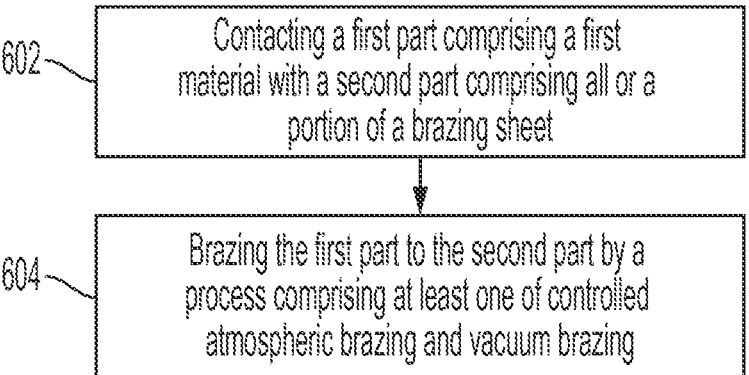
FIG. 6 is a block diagram of a non-limiting embodiment of a method according to the present disclosure for forming articles from materials including brazing sheets.

FIG. 6 is a block diagram of a non-limiting embodiment of a method according to the present disclosure for forming an article of manufacture such as, for example, a heat exchanger. The method embodiment comprises contacting a first part comprising a first material with a second part comprising all or a portion of an embodiment of a brazing sheet according to the present disclosure. For example, a non-limiting embodiment of a method according to the present disclosure may comprise contacting a first part comprising a first material with a second part comprising all or a portion of brazing sheet 100, brazing sheet 200, brazing sheet 300, and/or a different embodiment of a brazing sheet according to the present disclosure (FIG. 6, step 602). In various non-limiting embodiments, the first part can be brazed to the second part by a process comprising at least one of controlled atmospheric brazing and vacuum brazing (FIG. 6, step 604). In various embodiments, step 604 comprises controlled atmospheric brazing, wherein a flux is or is not used. For example, if the core layer and the one or more interliner layers of a brazing sheet according to the present disclosure comprise magnesium, flux may not be required when conducting controlled atmospheric brazing. However, if the core layer and the one or more interliner layers of a brazing sheet according to the present disclosure do not comprise magnesium, flux may be required when conducting controlled atmospheric brazing. In various non-limiting embodiments of a method as illustrated in FIG. 6, the first material comprises aluminum or an aluminum alloy.

EXAMPLES

A comparative brazing sheet and a non-limiting embodiment of a brazing sheet according to the present disclosure were prepared. Both brazing sheets comprised five layers bonded together, including a first brazing layer, a first interliner layer, a core layer, a second interliner layer, and a second brazing layer. The first interliner layer was intermediate the core layer and the first brazing layer, and the second interliner layer was intermediate the core layer and the second brazing layer. Both brazing sheets included identical brazing layers comprising a 4XXX series alloy and identical core layers comprising a 3003 series aluminum alloy that was at least partially recrystallized. The interliner layers included in both the comparative brazing sheet and the brazing sheet according to the present disclosure comprised, in weight percentages: up to 0.25 silicon; up to 0.6 iron; 0.2 to 0.4 copper; 0.8 to 1.3 manganese; up to 0.1 magnesium; up to 0.05 zinc; up to 0.35 titanium; and 0.12 zirconium; aluminum; and impurities. The interliner layers of the comparative brazing sheet were heat treated so as to be at least partially recrystallized and have an O-temper. The interliner layer of the brazing sheet according to the present disclosure were heat treated so as to be unrecrystallized and unhomogenized.

Figure 7A:
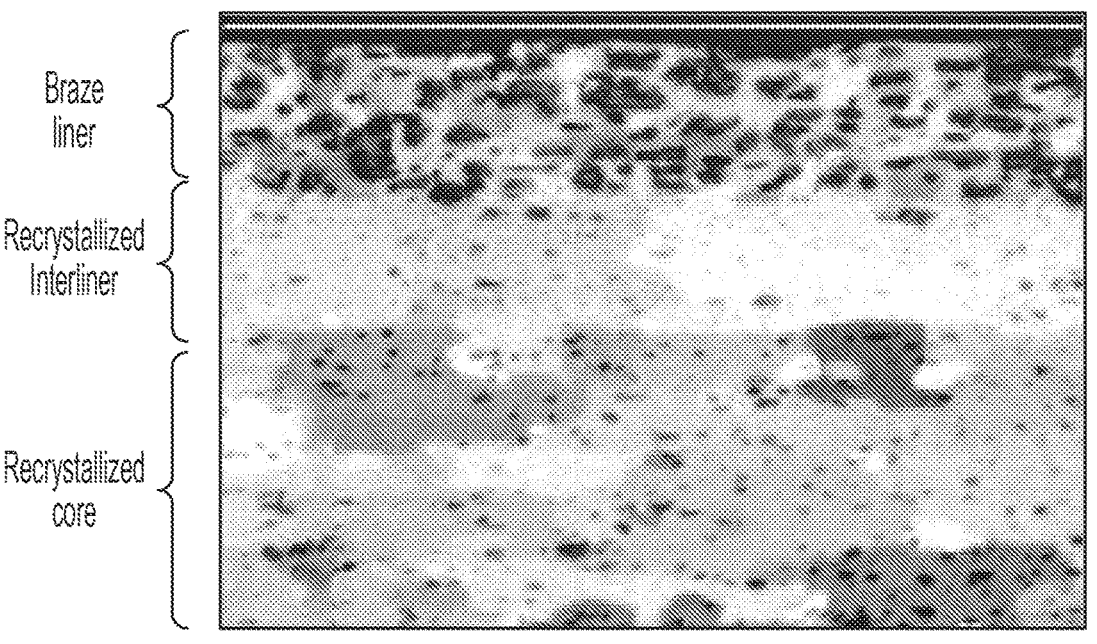
FIG. 7A is a photomicrograph showing a cross-sectional side view of a portion of a comparative brazing sheet including an interliner layer that is at least partially recrystallized.
Figure 7B:
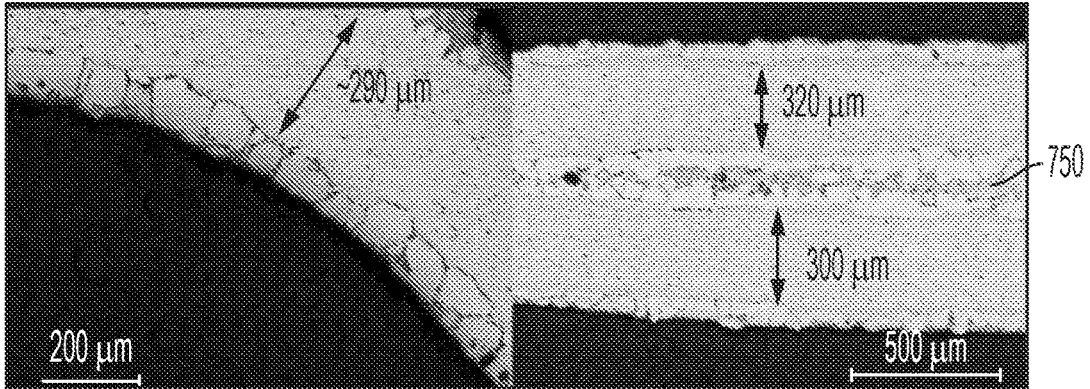
FIG. 7B provides photomicrographs showing cross-sectional side view of a portion of the comparative brazing sheet of FIG. 7A.
Figure 8A:
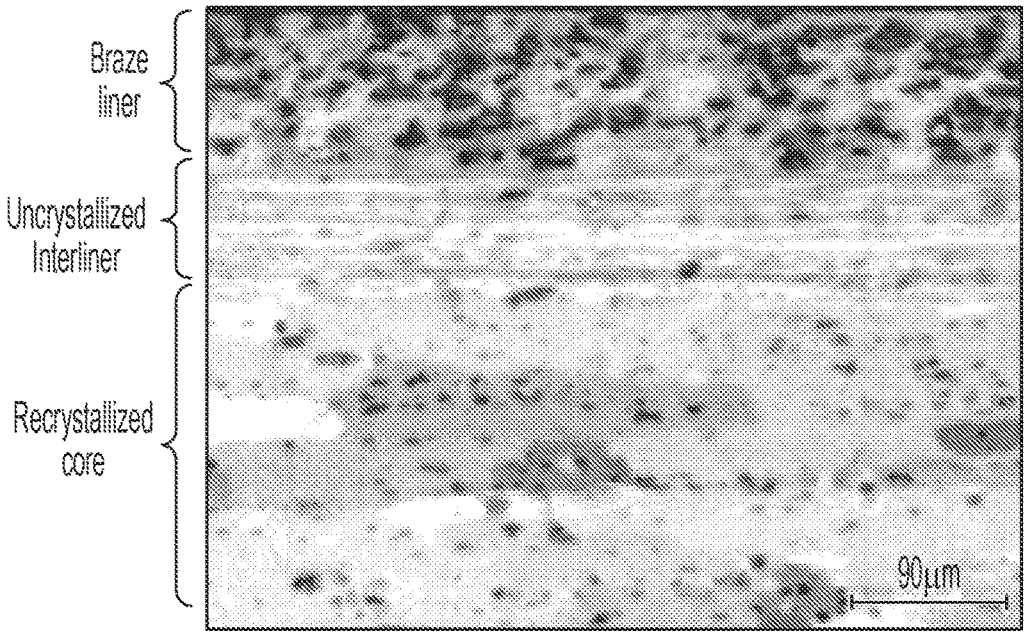
FIG. 8A is a photomicrograph showing a cross-sectional side view of a portion of a non-limiting embodiment of a brazing sheet according to the present disclosure comprising an interliner layer that is unrecrystallized.
Figure 8B:
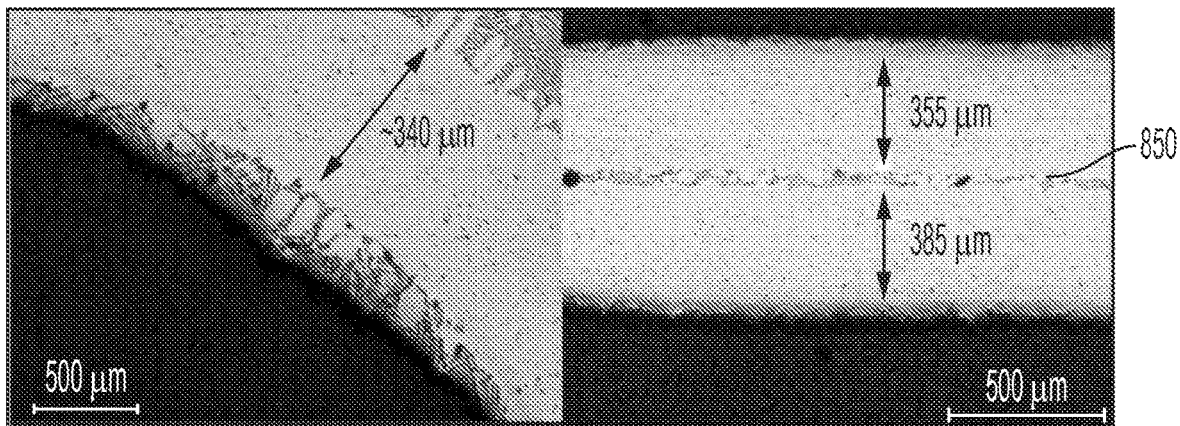
FIG. 8B provides photomicrographs showing a cross-sectional side view of a portion of the brazing sheet of FIG. 8A.

FIG. 7A is a micrograph of a cross-section of the microstructure of the comparative brazing sheet of this example in a pre-braze condition. FIG. 7B is a micrograph of a cross-section of the microstructure of the comparative brazing sheet of this example in a post-braze condition. FIG. 8A is a micrograph of a cross-section of the microstructure of the brazing sheet embodiment according to the present disclosure of this example in a pre-braze condition. FIG. 8B is a micrograph of a cross-section of the microstructure of the brazing sheet embodiment according to the present disclosure of this example in a post-braze condition. Referring to FIGS. 7B and 8B, the retained combined thickness of the core layer and interliner layer of the brazing sheet embodiment of the present disclosure of this example after brazing is 30 to 50 μm thicker than the combined thickness of the core layer and interliner layer of the comparative brazing sheet of this example after brazing. As illustrated in FIGS. 7B and 8B, a greater amount of liquid film migration has occurred at the interface 750 between the brazing layer and the interliner layer in the comparative brazing sheet compared to the interface 850 in the brazing sheet embodiment according to the present disclosure. Additionally, it was observed that the interliner layer in the comparative brazing sheet of this example had a greater content of pro-eutectic phase, which is indicative of liquid film migration. Also, the retained thickness of the core layer in the comparative brazing sheet of this example after brazing was 20% less than the retained thickness of the core layer in the brazing sheet according to the present disclosure of this example after brazing.

Additionally, the comparative brazing sheet and the brazing sheet according to the present disclosure evaluated in the present example were tested for ultimate tensile strength, tensile yield strength, and tensile elongation in a pre-braze condition. Table 1 provides the results.

TABLE 1

| Pre-braze mechanical properties | | | |
| --- | --- | --- | --- |
| | Ultimate Tensile Strength [MPa] | Tensile Yield Strength [MPa] | Tensile elongation [%] |
| Comparative Brazing Sheet | 141 | 81 | 22.7 |
| Brazing Sheet According to the Present disclosure | 142 | 86 | 23.1 |

As shown in Table 1, the measured mechanical properties of the brazing sheet according to the present disclosure and the comparative brazing sheet evaluated in this example differed only slightly. This indicates that the brazing sheet according to the present disclosure of this example exhibits formability comparable to a full O-temper brazing sheet. FIGS. 8A-8B illustrate the reduced liquid film migration occuring in the brazing sheet according to the present disclosure of this example relative to the comparative brazing sheet. This indicates that the brazing sheet according to the present disclosure evaluated in this example had enhanced corrosion resistance relative to the comparative brazing sheet.

The following numbered clauses are directed to various non-limiting embodiments and aspects according to the present disclosure.

Clause 1. A brazing sheet comprising:
   a core layer comprising a first aluminum alloy, wherein the core layer is at least partially recrystallized;
   a brazing layer comprising a 4XXX series aluminum alloy; and
   an interliner layer intermediate the core layer and the brazing layer and comprising a second aluminum alloy, wherein the interliner layer is unrecrystallized.

Clause 2. The brazing sheet of clause 1, wherein the first aluminum alloy has a first recrystallization temperature, the second aluminum alloy has a second recrystallization temperature, and the second recrystallization temperature is greater than the first recrystallization temperature.

Clause 3. The brazing sheet of any of clauses 1 and 2, wherein the core layer is homogenized.

Clause 4. The brazing sheet of any of clauses 1 to 3, wherein the interliner layer has a dislocation density of at least 100,000,000 per $cm^2$.

Clause 5. The brazing sheet of any of clauses 1 to 4, wherein the interliner layer does not comprise recrystallized grains that have a dislocation density no greater than 10,000,000 per $cm^2$.

Clause 6. The brazing sheet of any of clauses 1 to 5, wherein the core layer has a dislocation density no greater than 10,000,000 per $cm^2$.

Clause 7. The brazing sheet of any of clauses 1 to 6, wherein grains of the core layer have a first aspect ratio and grains of the interliner layer have a second aspect ratio, wherein the second aspect ratio is greater than the first aspect ratio, and wherein each aspect ratio refers to a ratio between the mean grain length and the grain height in the length to short transverse plane.

Clause 8. The brazing sheet of any of clauses 1 to 7, wherein the interliner layer is unhomogenized.

Clause 9. The brazing sheet of any of clauses 1 to 8, wherein the interliner layer is configured to inhibit liquid film migration.

Clause 10. The brazing sheet of any of clauses 1 to 9, wherein the second aluminum alloy comprises at least 0.01 weight percent zirconium, based on the total weight of the second aluminum alloy.

Clause 11. The brazing sheet of any of clauses 1 to 10, wherein the core layer, the interliner layer, and the brazing layer are bonded together.

Clause 12. The brazing sheet of any of clauses 1 to 11, wherein the first aluminum alloy is a 3XXX series aluminum alloy or a 6XXX series aluminum alloy.

Clause 13. The brazing sheet of any of clauses 1 to 12, wherein the first aluminum alloy comprises, in weight percentages based on total weight of the first aluminum alloy:
0 to 1.2 silicon;
0 to 1.0 copper;
0 to 0.25 zirconium;
0 to 0.8 iron;
0 to 2.0 manganese;
0 to 3.0 zinc;
0 to 1.5 magnesium;
0 to 0.25 titanium;
0 to 0.3 chromium;
0 to 0.5 bismuth;
aluminum; and
impurities.

Clause 14. The brazing sheet of any of clauses 1 to 13, wherein:
the brazing layer is a first brazing layer disposed on a first side of the core layer; and
a second brazing layer is disposed on a second side of the core layer opposite the first side of the core layer, wherein the second brazing layer comprises 1XXX series aluminum alloy, a 3XXX series aluminum alloy, a 3XXX series aluminum alloy, a 4XXX series aluminum alloy or a 7XXX series aluminum alloy.

Clause 15. The brazing sheet of any of clauses 1 to 14, wherein:
the brazing layer is a first brazing layer disposed on a first side of the core layer;
the interliner layer is a first interliner layer;
a second brazing layer is disposed on a second side of the core layer opposite the first side of the core layer, wherein the second brazing layer comprises 1XXX series aluminum alloy, a 3XXX series aluminum alloy, a 3XXX series aluminum alloy, a 4XXX series aluminum alloy or a 7XXX series aluminum alloy; and
a second interliner layer is disposed intermediate the core layer and the second brazing layer.

Clause 16. The brazing sheet of any of clauses 1 to 15, wherein the brazing sheet is suitable for at least one of controlled atmospheric brazing and vacuum brazing.

Clause 17. The brazing sheet of any of clauses 1 to 16, wherein the 4XXX series aluminum alloy of each brazing layer comprises, in weight percentages based on total weight of the 4XXX series aluminum alloy:
5 to 15 silicon;
0 to 2.0 magnesium;
0 to 1.0 iron;
0 to 3.0 zinc;
0 to 2.0 copper;
0 to 1.0 manganese;
0 to 0.2 titanium;

0 to 0.3 bismuth;
aluminum; and
impurities.

Clause 18. The brazing sheet of any of clauses 1 to 17, wherein:
the core layer comprises a first thickness in a range of 60% to 90% of a total thickness of the brazing sheet;
the interliner layer comprises a second thickness in a range of 3% to 20% of the total thickness of the brazing sheet; and
the brazing layer comprises a third thickness in a range of 3% to 20% of the total thickness of the brazing sheet.

Clause 19. A heat exchanger comprising a structural element comprising all or a portion of the brazing sheet of any of clauses 1 to 18.

Clause 20. A method for forming an article, the method comprising:
contacting a first part comprising a first material with a second part comprising all or a portion of the brazing sheet of any of clauses 1 to 18; and
brazing the first part to the second part by a process comprising at least one of controlled atmospheric brazing and vacuum brazing.

Clause 21. The method of clause 20, wherein the first material comprises aluminum or an aluminum alloy.

Clause 22. The method of any of clauses 20 to 21, wherein the article is a heat exchanger.

Clause 23. A brazing sheet comprising:
a core layer comprising a first aluminum alloy having a first recrystallization temperature;
a brazing layer comprising a 4XXX series aluminum alloy; and
an interliner layer intermediate the core layer and the brazing layer, and comprising a 3XXX series aluminum alloy having a second recrystallization temperature and comprising, in weight percentages based on total weight of the 3XXX series aluminum alloy:
0.01 to 0.2 silicon;
0 to 0.6 copper;
0.8 to 1.9 manganese;
0 to 0.2 chromium;
0 to 0.15 zirconium;
0 to 0.4 iron;
0 to 3 zinc;
0 to 0.2 magnesium;
0 to 0.3 titanium;
0 to 0.1 vanadium;
0 to 0.5 bismuth;
aluminum; and
impurities,
wherein the second recrystallization temperature is greater than the first recrystallization temperature.

Clause 24. The brazing sheet of clause 23, wherein a sum of the weight percentages of manganese, chromium, titanium, zirconium, and vanadium in the 3XXX series aluminum alloy is at least 2.0.

Clause 25. The brazing sheet of any of clauses 23 and 24, wherein a sum of the weight percentages of manganese, chromium, titanium, zirconium, and vanadium in the 3XXX series aluminum alloy is at least 2.1.

Clause 26. The brazing sheet of any of clauses 23 to 25, wherein the 3XXX series aluminum alloy of the interliner layer comprises, in weight percentages based on total weight of the 3XXX series aluminum alloy:
0.02 to 0.1 silicon;
0.3 to 0.6 copper;

1.75 to 1.9 manganese;
0.1 to 0.2 chromium;
0 to 0.15 zirconium;
0.05 to 0.4 iron;
0 to 1 zinc;
0.01 to 0.1 magnesium;
0 to 0.3 titanium;
0 to 0.1 vanadium;
0 to 0.5 bismuth;
aluminum; and
impurities.

Clause 27. The brazing sheet of any of clauses 23 to 26, wherein the core layer is at least partially recrystallized and the interliner layer is unrecrystallized.

Clause 28. The brazing sheet of any of clauses 23 to 27, a first sum of the weight percentages of manganese, chromium, and vanadium in the interliner layer is greater than a second sum of the weight percentages of manganese, chromium, and vanadium in the core layer.

Clause 29. The brazing sheet of any of clauses 23 to 28, wherein the core layer, the interliner layer, and the brazing layer are bonded together into the brazing sheet.

Clause 30. The brazing sheet of any of clauses 23 to 29, wherein the first aluminum alloy comprises, in weight percentages based on total weight of the first aluminum alloy:
0 to 1.2 silicon;
0 to 1.0 copper;
0 to 0.25 zirconium;
0 to 0.8 iron;
0 to 2 manganese;
0 to 3 zinc;
0 to 1.5 magnesium;
0 to 0.25 titanium;
0 to 0.3 chromium;
0 to 0.5 bismuth;
aluminum; and
impurities.

Clause 31. The brazing sheet of any of clauses 23 to 30, wherein:
the interliner layer is a first interliner layer disposed on a first side of the core layer; and
a second brazing layer is disposed on a second side of the core layer opposite the first side of the core layer, wherein the second brazing layer comprises 1XXX series aluminum alloy, a 3XXX series aluminum alloy, a 3XXX series aluminum alloy, a 4XXX series aluminum alloy or a 7XXX series aluminum alloy.

Clause 32. The brazing sheet of any of clauses 23 to 30, wherein:
the brazing layer is a first brazing layer disposed on a first side of the core layer;
the interliner layer is a first interliner layer;
a second brazing layer is disposed on a second side of the core layer opposite the first side of the core layer, wherein the second brazing layer comprises a 1XXX series aluminum alloy, a 3XXX series aluminum alloy, a 3XXX series aluminum alloy, a 4XXX series aluminum alloy or a 7XXX series aluminum alloy; and
a second interliner layer is disposed intermediate the core layer and the second brazing layer.

Clause 33. The brazing sheet of any of clauses 23 to 32, wherein the brazing sheet is suitable for at least one of controlled atmospheric brazing and vacuum brazing.

Clause 34. The brazing sheet of any of clauses 23 to 33, wherein the 4XXX series aluminum alloy of each brazing layer individually comprises, in weight percentages based on total weight of the 4XXX series aluminum alloy:
5 to 15 silicon;
0 to 2.0 magnesium;
0 to 1.0 iron;
0 to 3.0 zinc;
0 to 2.0 copper;
0 to 1.0 manganese;
0 to 0.2 titanium;
0 to 0.3 bismuth;
aluminum; and
impurities.

Clause 35. The brazing sheet of any of clauses 23 to 34, wherein:
the core layer comprises a first thickness in a range of 60% to 90% of a total thickness of the brazing sheet;
each interliner layer comprises a second thickness in a range of 3% to 20% of the total thickness of the brazing sheet; and
each brazing layer comprises a third thickness in a range of 3% to 20% of the total thickness of the brazing sheet.

Clause 36. The brazing sheet of any of clauses 23 to 35, wherein the core layer is homogenized.

Clause 37. A method for forming the brazing sheet of any of clauses 1 to 36 the brazing sheet comprising a core layer, at least one brazing layer, and at least one interliner layer, the method comprising:
homogenizing the core layer to form a homogenized core layer;
hot working a workpiece comprising the 3XXX series aluminum alloy to form the at least one interliner layer; and
hot rolling the at least one brazing layer, the at least one interliner layer, and the homogenized core layer together to form the brazing sheet.

Clause 38. A brazing sheet formed by the method of clause 37.

Clause 39. A heat exchanger comprising a structural element comprising all or a portion of the brazing sheet of any of clauses 23 to 36 and 38.

Clause 40. A method for forming an article of manufacture, the method comprising:
contacting a first part comprising a first material with a second part comprising all or a portion of the brazing sheet of any of clauses 23 to 36 and 38; and
brazing the first part to the second part by a process comprising at least one of controlled atmospheric brazing and vacuum brazing.

Clause 41. The method of clause 40, wherein the first material comprises aluminum or an aluminum alloy.

Clause 42. The method of any of clauses 40 and 41, wherein the article is a heat exchanger.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Also, all ranges recited herein are inclusive of the end points of the recited ranges. For example, a range of "1 to 10" includes the end points 1 and 10. Any maximum numerical limitation recited in this specification is intended to include all lower numerical limitations subsumed therein, and any minimum numerical limitation recited in this speci-fication is intended to include all higher numerical limita-tions subsumed therein. Accordingly, Applicant reserves the right to amend this specification, including the claims, to expressly recite any sub-range subsumed within the ranges expressly recited. All such ranges are inherently described in this specification.

The grammatical articles "a", "an", and "the", as used herein, are intended to include "at least one" or "one or more", unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

One skilled in the art will recognize that the herein described articles and methods, and the discussion accom-panying them, are used as examples for the sake of concep-tual clarity and that various configuration modifications are contemplated. Consequently, as used herein, the specific examples/embodiments set forth and the accompanying dis-cussions are intended to be representative of their more general classes. In general, use of any specific exemplar is intended to be representative of its class, and the non-inclusion of specific components, devices, operations/ac-tions, and objects should not be taken to be limiting. While the present disclosure provides descriptions of various spe-cific aspects for the purpose of illustrating various aspects of the present disclosure and/or its potential applications, it is understood that variations and modifications will occur to those skilled in the art. Accordingly, the invention or inven-tions described herein should be understood to be at least as broad as they are claimed and not as more narrowly defined by particular illustrative aspects provided herein.

What is claimed is:

1. A brazing sheet comprising:
a core layer comprising a first aluminum alloy, wherein the core layer is at least partially recrystallized;
a brazing layer comprising a 4XXX series aluminum alloy; and
an interliner layer intermediate the core layer and the brazing layer and comprising a second aluminum alloy comprising, in weight percentages based on the total weight of the second aluminum alloy:
0.02 to 0.2 silicon;
0.3 to 0.6 copper;
1.75 to 1.9 manganese;
0.1 to 0.2 chromium;
0 to 0.15 zirconium;
0.05 to 0.4 iron;
0 to 1.0 zinc;
0.01 to 0.1 magnesium;
0 to 0.3 titanium;
0 to 0.1 vanadium;
0 to 0.5 bismuth; and
aluminum;
wherein the interliner layer is unrecrystallized.

2. The brazing sheet of claim 1, wherein the first alumi-num alloy has a first recrystallization temperature, the sec-ond aluminum alloy has a second recrystallization tempera-ture, and the second recrystallization temperature is greater than the first recrystallization temperature.

3. The brazing sheet of claim 1, wherein the core layer is homogenized.

4. The brazing sheet of claim 1, wherein the interliner layer has a dislocation density of at least 100,000,000 per $cm^2$.

5. The brazing sheet of claim 1, wherein the interliner layer does not comprise recrystallized grains that have a dislocation density no greater than 10,000,000 per $cm^2$.

6. The brazing sheet of claim 1, wherein the core layer has a dislocation density no greater than 10,000,000 per $cm^2$.

7. The brazing sheet of claim 1, wherein grains of the core layer have a first aspect ratio and grains of the interliner layer have a second aspect ratio, wherein the second aspect ratio is greater than the first aspect ratio, and wherein each aspect ratio refers to a ratio between the mean grain length and the grain height in the length to short transverse plane.

8. The brazing sheet of claim 1, wherein the interliner layer is unhomogenized.

9. The brazing sheet of claim 1, wherein the interliner layer is configured to inhibit liquid film migration.

10. The brazing sheet of claim 1, wherein the second aluminum alloy comprises at least 0.01 weight percent zirconium, based on the total weight of the second aluminum alloy.

11. The brazing sheet of claim 1, wherein the core layer, the interliner layer, and the brazing layer are bonded together.

12. The brazing sheet of claim 1, wherein the first aluminum alloy is a 3XXX series aluminum alloy or a 6XXX series aluminum alloy.

13. The brazing sheet of claim 1, wherein the first aluminum alloy comprises, in weight percentages based on total weight of the first aluminum alloy:
0 to 1.2 silicon;
0 to 1.0 copper;
0 to 0.25 zirconium;
0 to 0.8 iron;
0 to 2.0 manganese;
0 to 3.0 zinc;
0 to 1.5 magnesium;
0 to 0.25 titanium;
0 to 0.3 chromium;
0 to 0.5 bismuth;
aluminum; and
impurities.

14. The brazing sheet of claim 1, wherein:
the brazing layer is a first brazing layer disposed on a first side of the core layer; and
a second brazing layer is disposed on a second side of the core layer opposite the first side of the core layer, wherein the second brazing layer comprises 1XXX series aluminum alloy, a 3XXX series aluminum alloy, a 3XXX series aluminum alloy, a 4XXX series alumi-num alloy or a 7XXX series aluminum alloy.

15. The brazing sheet of claim 1, wherein:
the brazing layer is a first brazing layer disposed on a first side of the core layer;
the interliner layer is a first interliner layer;
a second brazing layer is disposed on a second side of the core layer opposite the first side of the core layer, wherein the second brazing layer comprises a 1XXX series aluminum alloy, a 3XXX series aluminum alloy, a 4XXX series aluminum alloy or a 7XXX series aluminum alloy; and a second interliner layer is disposed intermediate the core layer and the second brazing layer.

16. The brazing sheet of claim 1, wherein the brazing sheet is suitable for at least one of controlled atmospheric brazing and vacuum brazing.

17. The brazing sheet of claim 1, wherein the 4XXX series aluminum alloy of each brazing layer comprises, in weight percentages based on total weight of the 4XXX series aluminum alloy:

5 to 15 silicon;
0 to 2.0 magnesium;
0 to 1.0 iron;
0 to 3.0 zinc;
0 to 2.0 copper;
0 to 1.0 manganese;
0 to 0.2 titanium;
0 to 0.3 bismuth;
aluminum; and
impurities.

18. The brazing sheet of claim 1, wherein:

the core layer comprises a first thickness in a range of 60% to 90% of a total thickness of the brazing sheet;

the interliner layer comprises a second thickness in a range of 3% to 20% of the total thickness of the brazing sheet; and the brazing layer comprises a third thickness in a range of 3% to 20% of the total thickness of the brazing sheet.

19. A heat exchanger comprising a structural element comprising all or a portion of the brazing sheet of any of claim 1.

20. A method for forming an article, the method comprising:

contacting a first part comprising a first material with a second part comprising all or a portion of the brazing sheet of claim 1; and brazing the first part to the second part by a process comprising at least one of controlled atmospheric brazing and vacuum brazing.

21. The method of claim 20, wherein the first material comprises aluminum or an aluminum alloy.

22. The method of claim 20, wherein the article is a heat exchanger.

* * * * *